(12) United States Patent
Fiske

(10) Patent No.: US 10,356,061 B2
(45) Date of Patent: *Jul. 16, 2019

(54) HIDING A PUBLIC KEY EXCHANGE IN NOISE

(71) Applicant: FISKE SOFTWARE LLC, San Francisco, CA (US)

(72) Inventor: Michael Stephen Fiske, San Francisco, CA (US)

(73) Assignee: Fiske Software, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,596

(22) Filed: May 19, 2016

(65) Prior Publication Data

US 2017/0099272 A1    Apr. 6, 2017

Related U.S. Application Data

(63) Continuation-in-part of application No. 14/953,300, filed on Nov. 28, 2015.
(Continued)

(51) Int. Cl.
*G06F 21/60* (2013.01)
*H04L 29/06* (2006.01)
(Continued)

(52) U.S. Cl.
CPC .......... *H04L 63/061* (2013.01); *G06F 21/602* (2013.01); *H04K 1/02* (2013.01);
(Continued)

(58) Field of Classification Search
CPC . G06F 21/606; G06F 21/6263; H04L 9/0869; H04L 63/061; H04L 63/0428;
(Continued)

(56) References Cited

U.S. PATENT DOCUMENTS 7,643,637 B2 *   1/2010   Venkatesan ........... H04L 1/0057
                                                       375/245
8,615,087 B2 *  12/2013   DiCrescenzo ........... H04K 1/04
                                                       380/287

(Continued)

OTHER PUBLICATIONS

Wikipedia, Hardware Random Number Generator, 2018, Wikipedia, pp. 1-9.*

*Primary Examiner* — Joseph P Hirl
*Assistant Examiner* — Stephen T Gundry
(74) *Attorney, Agent, or Firm* — David Lewis

(57) ABSTRACT

A process of hiding one or more public keys inside of random noise is introduced, whose purpose is to protect the privacy of the public keys. In some embodiments, the random noise is produced by quantum randomness, using photonic emission with a light emitting diode. When the public key generation and random noise have the same probability distributions, and the key size is fixed, the security of the hiding can be made arbitrarily close to perfect secrecy, by increasing the noise size. The process of hiding can protect public keys that are vulnerable to Shor's algorithm or analogs of Shor's algorithm, executed by a quantum computer. The hiding process is practical in terms of infrastructure and cost, utilizing the existing TCP/IP infrastructure as a transmission medium, and a light emitting diode(s) in the random noise generator.

29 Claims, 16 Drawing Sheets

Related U.S. Application Data

(60) Provisional application No. 62/185,585, filed on Jun. 27, 2015, provisional application No. 62/163,970, filed on May 19, 2015, provisional application No. 62/085,338, filed on Nov. 28, 2014, provisional application No. 62/092,795, filed on Dec. 16, 2014.

(51) Int. Cl.
  *H04L 9/30* (2006.01)
  *H04L 9/32* (2006.01)
  *H04L 9/08* (2006.01)
  *H04K 1/02* (2006.01)

(52) U.S. Cl.
  CPC .......... *H04L 9/0827* (2013.01); *H04L 9/3066* (2013.01); *H04L 9/3236* (2013.01); *H04L 9/3242* (2013.01); *H04L 63/0435* (2013.01); *H04L 63/0442* (2013.01); *H04L 63/1466* (2013.01); *H04L 2209/046* (2013.01)

(58) Field of Classification Search
  CPC .. H04L 9/3236; H04L 9/0618; H04L 2209/16
  See application file for complete search history.

(56) References Cited

U.S. PATENT DOCUMENTS

| | | | | |
|---|---|---|---|---|
| 9,235,697 | B2* | 1/2016 | Fiske | H04L 9/0844 |
| 9,306,739 | B1* | 4/2016 | Troupe | H04L 9/0852 |
| 9,425,954 | B1* | 8/2016 | Chalker | H04L 9/0668 |
| 2003/0223579 | A1* | 12/2003 | Kanter | H04L 9/304 380/28 |
| 2005/0036624 | A1* | 2/2005 | Kent | H04L 9/0858 380/277 |
| 2005/0152540 | A1* | 7/2005 | Barbosa | H04L 9/0858 380/28 |
| 2006/0098819 | A1* | 5/2006 | Zeng | H04L 9/3013 380/44 |
| 2007/0079123 | A1* | 4/2007 | Iwamura | H04L 63/061 713/171 |
| 2007/0099597 | A1* | 5/2007 | Arkko | H04L 9/3236 455/411 |
| 2007/0133798 | A1* | 6/2007 | Elliott | H04B 10/70 380/255 |
| 2007/0192598 | A1* | 8/2007 | Troxel | H04L 9/0852 713/168 |
| 2007/0230688 | A1* | 10/2007 | Tajima | H04L 9/0858 380/30 |
| 2008/0025504 | A1* | 1/2008 | Rapp | H04L 9/0844 380/46 |
| 2008/0044027 | A1* | 2/2008 | Van Dijk | H04L 9/0866 380/278 |
| 2008/0089518 | A1* | 4/2008 | Reznik | H04L 9/065 380/268 |
| 2009/0003701 | A1* | 1/2009 | Rekhi | G06T 1/0021 382/176 |
| 2009/0161870 | A1* | 6/2009 | Rosenberg | G06F 21/6218 380/268 |
| 2009/0323718 | A1* | 12/2009 | Oren-Dahan | H04L 63/029 370/466 |
| 2010/0034377 | A1* | 2/2010 | Kamel Ariffin | H04L 9/001 380/46 |
| 2010/0046755 | A1* | 2/2010 | Fiske | H04L 9/0822 380/256 |
| 2010/0067701 | A1* | 3/2010 | Patwari | H04L 9/0838 380/279 |
| 2010/0080386 | A1* | 4/2010 | Donnangelo | H04L 1/0009 380/256 |
| 2011/0055585 | A1* | 3/2011 | Lee | H04L 9/0844 713/183 |
| 2011/0085666 | A1* | 4/2011 | Hicks | H04L 9/0852 380/278 |
| 2011/0274273 | A1* | 11/2011 | Fiske | G06F 21/32 380/46 |
| 2011/0280397 | A1* | 11/2011 | Patwar | H04L 63/06 380/44 |
| 2011/0280405 | A1* | 11/2011 | Habif | H04B 10/70 380/278 |
| 2012/0045053 | A1* | 2/2012 | Qi | G06F 7/588 380/252 |
| 2012/0121080 | A1* | 5/2012 | Kerschbaum | H04L 9/085 380/28 |
| 2012/0195428 | A1* | 8/2012 | Wellbrock | H04L 9/0855 380/255 |
| 2012/0221615 | A1* | 8/2012 | Cerf | G06F 7/588 708/250 |
| 2012/0300925 | A1* | 11/2012 | Zaverucha | H04L 51/00 380/46 |
| 2013/0089204 | A1* | 4/2013 | Kumar | H04L 9/0852 380/256 |
| 2013/0132723 | A1* | 5/2013 | Gaborit | H04L 9/304 713/171 |
| 2013/0163759 | A1* | 6/2013 | Harrison | H04L 9/0852 380/268 |
| 2013/0251145 | A1* | 9/2013 | Lowans | H04L 9/0838 380/44 |
| 2013/0315395 | A1* | 11/2013 | Jacobs | H04L 9/0852 380/278 |
| 2013/0329886 | A1* | 12/2013 | Kipnis | H04L 9/30 380/255 |
| 2014/0025952 | A1* | 1/2014 | Marlow | H04L 63/0428 713/168 |
| 2014/0098955 | A1* | 4/2014 | Hughes | H04K 1/02 380/256 |
| 2014/0201536 | A1* | 7/2014 | Fiske | H04L 9/0844 713/183 |
| 2014/0270165 | A1* | 9/2014 | Durand | H04L 9/0869 380/46 |
| 2014/0331050 | A1* | 11/2014 | Armstrong | H04L 9/0855 713/171 |
| 2014/0372812 | A1* | 12/2014 | Lutkenhaus | H04L 9/0855 714/57 |
| 2015/0106623 | A1* | 4/2015 | Holman | H04L 63/0457 713/171 |
| 2015/0188701 | A1* | 7/2015 | Nordholt | H04L 9/0852 713/171 |
| 2015/0295707 | A1* | 10/2015 | Howe | H04L 9/0858 380/28 |
| 2015/0295708 | A1* | 10/2015 | Howe | H04L 9/0858 380/28 |
| 2015/0326392 | A1* | 11/2015 | Cheng | H04L 9/30 380/28 |
| 2016/0034682 | A1* | 2/2016 | Fiske | H04L 63/08 726/19 |
| 2016/0112192 | A1* | 4/2016 | Earl | H04L 9/0858 380/44 |
| 2016/0117149 | A1* | 4/2016 | Caron | G06F 7/588 708/255 |
| 2016/0234017 | A1* | 8/2016 | Englund | H04B 10/70 |
| 2016/0380765 | A1* | 12/2016 | Hughes | H04K 1/02 380/256 |
| 2017/0010865 | A1* | 1/2017 | Sanguinetti | H04L 9/0852 |
| 2017/0034167 | A1* | 2/2017 | Figueira | H04L 63/0876 |

\* cited by examiner

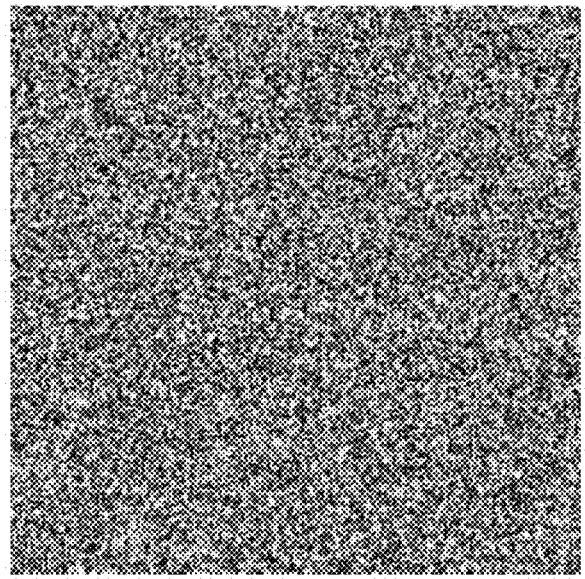
Figure 6  Hidden Key

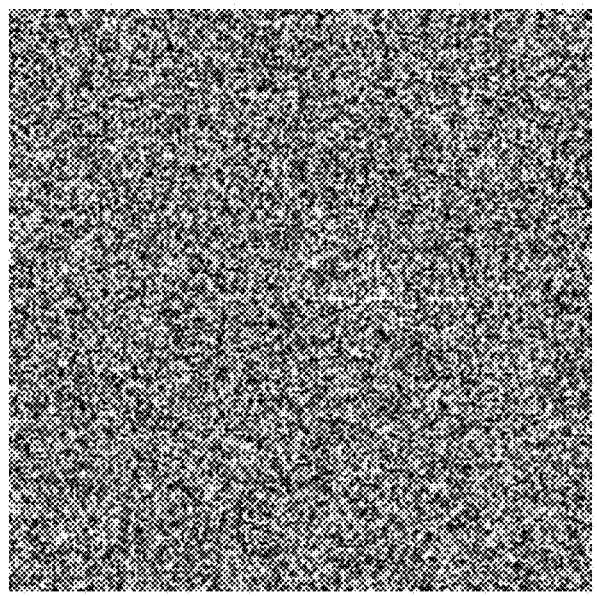
Figure 7  Somewhat Biased

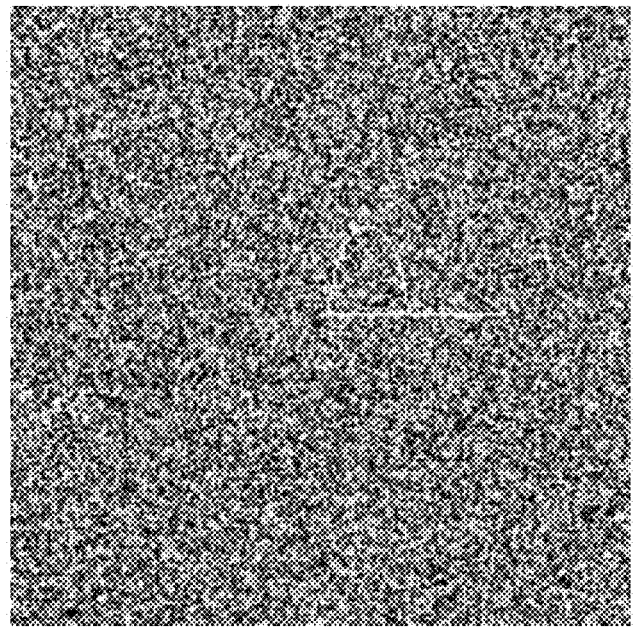
Figure 8 — More Biased

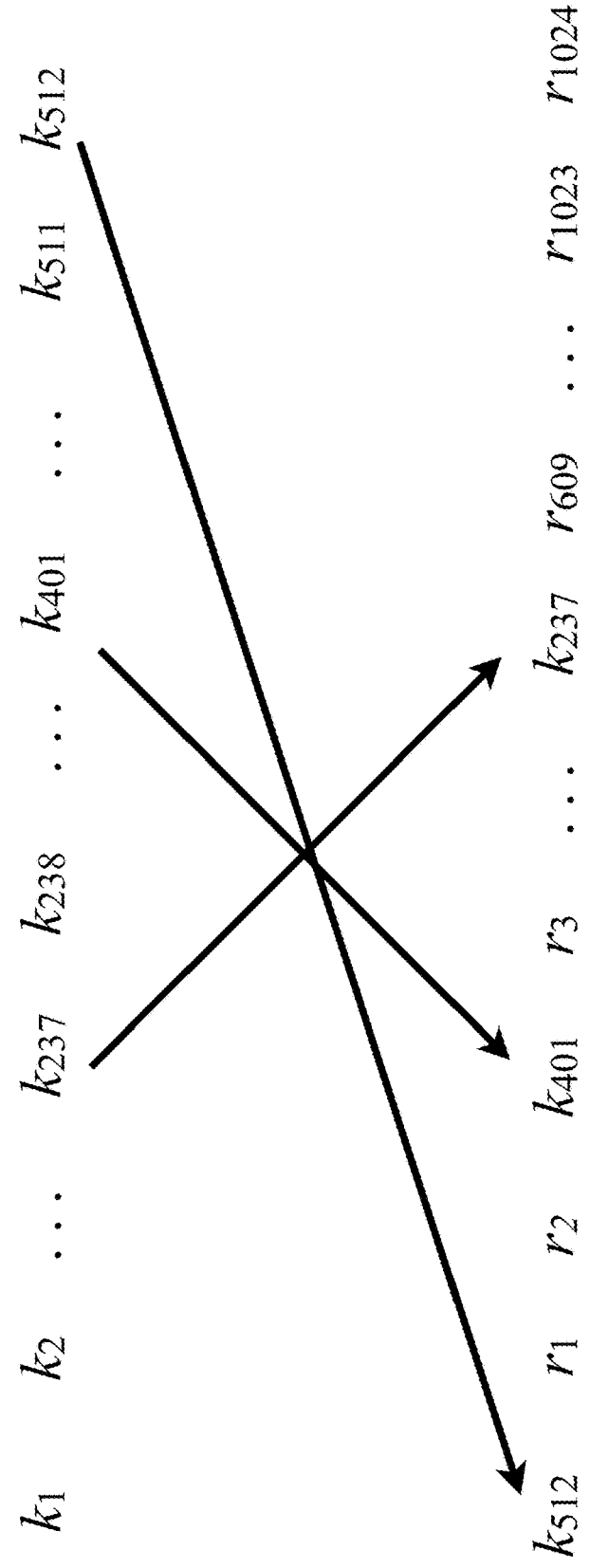

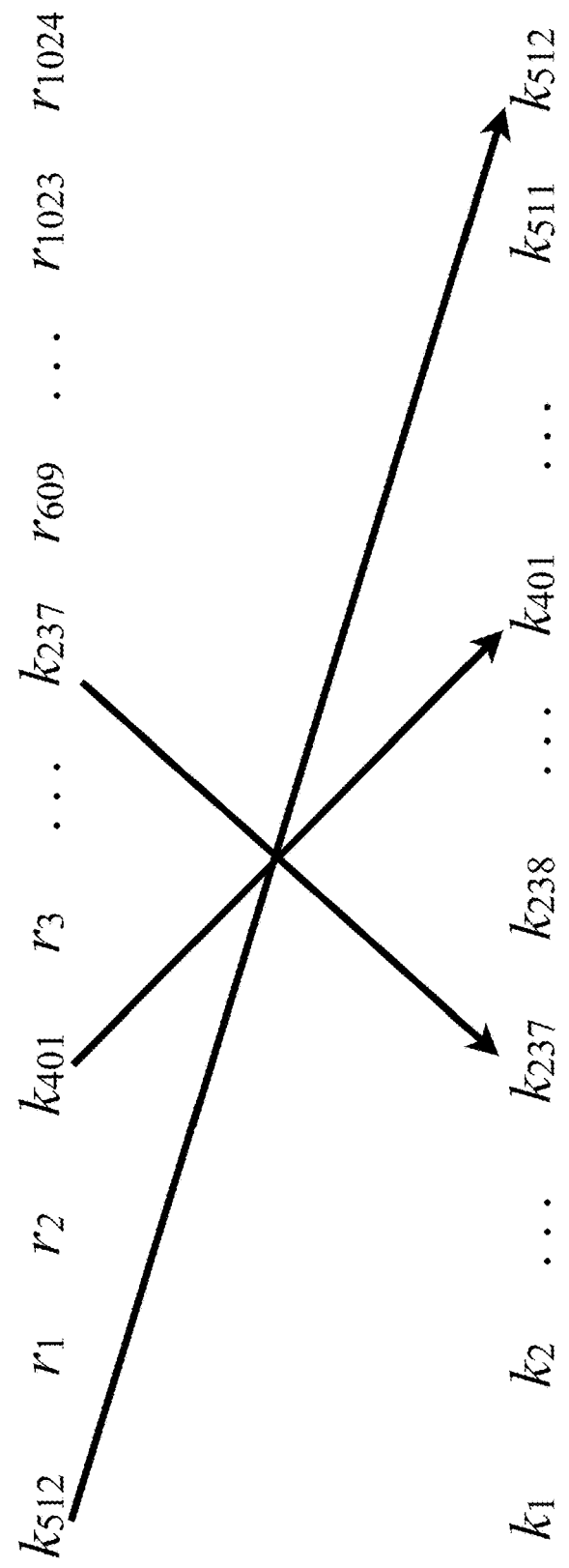

HIDING A PUBLIC KEY EXCHANGE IN NOISE

RELATED APPLICATIONS

This application claims priority benefit of U.S. Provisional Patent Application Ser. No. 62/085,338, entitled "Hiding Data Transmissions in Random Noise", filed Nov. 28, 2014, which is incorporated herein by reference; this application claims priority benefit of U.S. Provisional Patent Application Ser. No. 62/092,795, entitled "Hiding Data Transmissions in Random Noise", filed Dec. 16, 2014, which is incorporated herein by reference.

This application claims priority benefit of U.S. Provisional Patent Application Ser. No. 62/163,970, entitled "Hiding Data Transmissions in Random Noise", filed May 19, 2015, which is incorporated herein by reference; this application claims priority benefit of U.S. Provisional Patent Application Ser. No. 62/185,585, entitled "Hiding Data Transmissions in Random Noise", filed Jun. 27, 2015, which is incorporated herein by reference. This application claims priority benefit of U.S. Non-provisional patent application Ser. No. 14/953,300, entitled "Hiding Information in Noise", filed Nov. 28, 2015, which is incorporated herein by reference; and this application is a continuation-in-part of U.S. Non-provisional patent application Ser. No. 14/953,300, entitled "Hiding Information in Noise", filed Nov. 28, 2015.

BACKGROUND

Field of Invention

The present invention relates broadly to protecting the privacy of information and devices. The processes and device are generally used to maintain the privacy of information transmitted through communication and transmission systems. For example, the hiding processes may be used to conceal one or more public keys transmitted during a Diffie-Hellman exchange; in some embodiments, the public keys may be transmitted inside noise via IP (internet protocol). These processes and devices also may be used to hide passive public keys stored on a computer or another physical device such as a tape drive. In some embodiments, symmetric cryptographic methods and machines are also used to supplement the hiding process.

Typically, the information—public key(s)—is hidden by a sending agent, called Alice. Alice transmits one or more hidden public key(s) to a receiving agent, called Bob. The receiving agent, Bob, applies an extraction process or device. The output of this extraction process or device is the same public keys that Alice computed before hiding and sending them. Eve is the name of the agent who is attempting to obtain or capture the public keys transmitted between Alice and Bob. One of Alice and Bob's primary goals is to assure that Eve cannot capture the public keys that were hidden and transmitted between Alice and Bob. The hiding of public keys can help stop Eve from performing a man-in-the-middle attack on Alice and Bob's public key exchange because in order to successfully launch a man-in-the-middle attack, Eve must know Alice and Bob's public keys.

Prior Art

The subject matter discussed in this background section should not be assumed to be prior art merely as a result of its mention in the background section. Similarly, a problem mentioned in the background section or associated with the subject matter of the background section should not be assumed to have been previously recognized in the prior art. The subject matter in the Summary and some Advantages of Invention section represents different approaches, which in and of themselves may also be inventions, and various problems, which may have been first recognized by the inventor.

In information security, a fundamental problem is for a sender, Alice, to securely transmit a message M to a receiver, Bob, so that the adversary, Eve, receives no information about the message. In Shannon's seminal paper [1], his model assumes that Eve has complete access to a public, noiseless channel: Eve sees an identical copy of ciphertext C that Bob receives, where C(M, K) is a function of message M lying in message space $\mathcal{M}$ and secret key K lying in key space $\mathcal{K}$.

In this specification, the symbol P will express a probability. The expression P(E) is the probability that event E occurs and it satisfies $0 \leq P(E) \leq 1$. For example, suppose the sample space is the 6 faces of die and E is the event of rolling a 1 or 5 with that die and each of the 6 faces is equally likely. Then $P(E)=2/6=1/3$. The conditional probability $$P(A \mid B) = \frac{P(A \cap B)}{P(B)}.$$

$P(A \cap B)$ is the probability that event A occurs and also event B occurs. The conditional probability $P(A|B)$ expresses the probability that event A will occur, under the condition that someone knows event B already occurred. The expression that follows the symbol "|" represents the conditional event. Events A and B are independent if $P(A \cap B) = P(A)P(B)$.

Expressed in terms of conditional probabilities, Shannon [1] defined a cryptographic method to be perfectly secret if P(M)=P(M|Eve sees ciphertext C) for every cipher text C and for every message M in the message space $\mathcal{M}$. In other words, Eve has no more information about what the message M is after Eve sees ciphertext C pass through the public channel. Shannon showed for a noiseless, public channel that the entropy of the keyspace $\mathcal{K}$ must be at least as large as the message space $\mathcal{M}$ in order to achieve perfect secrecy.

Shannon's communication secrecy model [1] assumes that message sizes in the message space are finite and the same size. Shannon's model assumes that the transformations (encryption methods) on the message space are invertible and map a message of one size to the same size. Shannon's model assumes that the transformation applied to the message is based on the key. In the prior art, there is no use of random noise that is independent of the message or the key. In the prior art, there is no notion of being able to send a hidden or encrypted message inside the random noise where Eve is not necessarily revealed the size of the message. In the prior art, there is no notion of using random noise to hide the secret channel and transmitting a key inside this channel that is indistinguishable from the noise.

Quantum cryptography was introduced by Weisner and eventually published by Bennett, Brassard, et al. [2, 3]. Quantum cryptography based on the uncertainty principle of quantum physics: by measuring one component of the polarization of a photon, Eve irreversibly loses her ability to measure the orthogonal component of the polarization. Unfortunately, this type of cryptography requires an expensive physical infrastructure that is challenging to implement over long distances [4, 5]. The integrity of the polarization depends upon this physical infrastructure; it is possible for Eve to tamper with the infrastructure so that Alice and Bob, who are at the endpoints, are unable to adequately inspect or find this tampering. Furthermore, Alice and Bob still need a shared, authentication secret to successfully perform this quantum cryptography in order to assure that Eve cannot corrupt messages about the polarization bases, communicated on Alice and Bob's public channel.

SUMMARY AND SOME ADVANTAGES OF THE INVENTION(S)

The invention(s), described herein, demonstrate that our process of hiding public key(s) inside noise is quite effective. A process for hiding one or more public keys inside of random noise is described. In some embodiments, the hidden public keys may be transmitted between Alice and Bob as a part of a new kind of key exchange. In some embodiments, the hidden public keys may be transmitted over a channel such as the TCP/IP infrastructure [6].

The invention(s) described herein are not bound to Shannon's limitations [1] because they use noise, rather than seek to eliminate noise. When the public key generation and random noise have a uniform probability distribution, and the key size is fixed, the security of the key transmission can be made arbitrarily close to perfect secrecy—where arbitrarily close is defined in section 7.10—by increasing the noise size. The processes, devices and machines described herein are practical; they can be implemented with current TCP/IP infrastructure acting as a transmission medium and a random noise generator providing the random noise and key generation.

Advantages and Favorable Properties

Overall, our invention(s) that hide public keys inside random noise exhibit the following favorable security properties.

- The hiding process is O(n), where n is the size of the noise plus the size of the hidden keys.
- For a fixed key size m bits and $\rho=n-m$ bits of random noise, as $\rho \to \infty$, the security of the hidden public key(s) for a single transmission can be made arbitrarily close to perfect secrecy. In some applications, the key size can also be kept secret and is not revealed to Eve.
- From the binomial distribution, the closeness to perfect secrecy can be efficiently computed.
- The scatter map $\alpha$ can safely reused when both the key generation and noise generation have the same probability distribution and a new random key and new noise are created for each transmission.
- The complexity of finding the hidden public key(s) can be substantially greater than the computational complexity of the underlying public key cryptography. The hiding of the public keys can protect public keys that are vulnerable to Shor's algorithm or analogues of Shor's algorithm, executed on a quantum computer. Public keys that are resistant to quantum algorithms are typically much larger than $n=m+\rho$, where n represents the noise size plus the size of the public keys.
- Our hiding process uses a noiseless, public channel, which means it can implemented with our current Transmission Control Protocol/Internet Protocol internet infrastructure (TCP/IP). No expensive, physical infrastructure is needed to create noisy channels or transmit and maintain polarized photons, as is required by the prior art of quantum cryptography. Random noise generators are commercially feasible and inexpensive. A random noise generator that produces more than 10,000 random bits per second can be manufactured in high volume for less than three U.S. dollars per device.
- This system design decentralizes the security to each user so that Alice and Bob possess their sources of randomness. Decentralization helps eliminate potential single points of failure, and backdoors in the transmission medium that may be outside the inspection and control of Alice and Bob.

DESCRIPTION of FIGURES

In the following figures, although they may depict various examples of the invention, the invention is not limited to the examples depicted in the figures.

FIG. 6 shows a public key hidden in random noise where the probability distribution of the keys and the noise are uniform.

FIG. 7 shows a public key hidden in random noise where the probability distribution of the key and the noise are not the same. The probability distribution of the key is somewhat biased.

FIG. 8 shows a public key hidden in random noise where the probability distribution of the key and the noise are not the same. The probability distribution of the key is more biased than in FIG. 7.

Non-deterministic generator 952 contains a light emitting diode 956 that emits photons and a phototdiode 954 that absorbs photons.

Figure 9A:
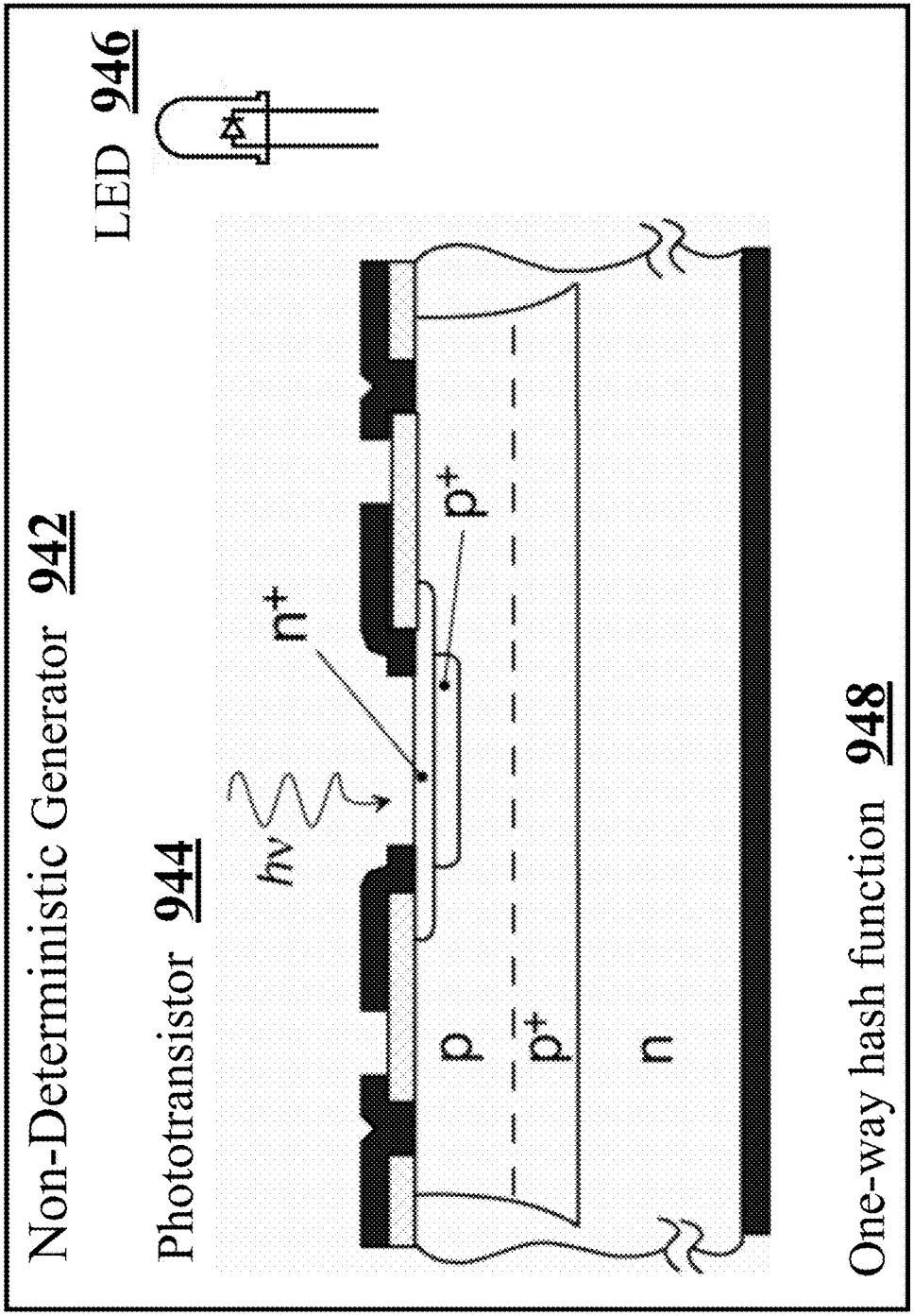
FIG. 9A shows an embodiment of a non-deterministic generator, based on quantum randomness. Non-deterministic generator 942 is based on the behavior of photons to help generate noise and in some embodiments one or more keys. Non-deterministic generator 942 contains a light emitting diode 946 that emits photons and a phototransistor 944 that absorbs photons.
Figure 9B:
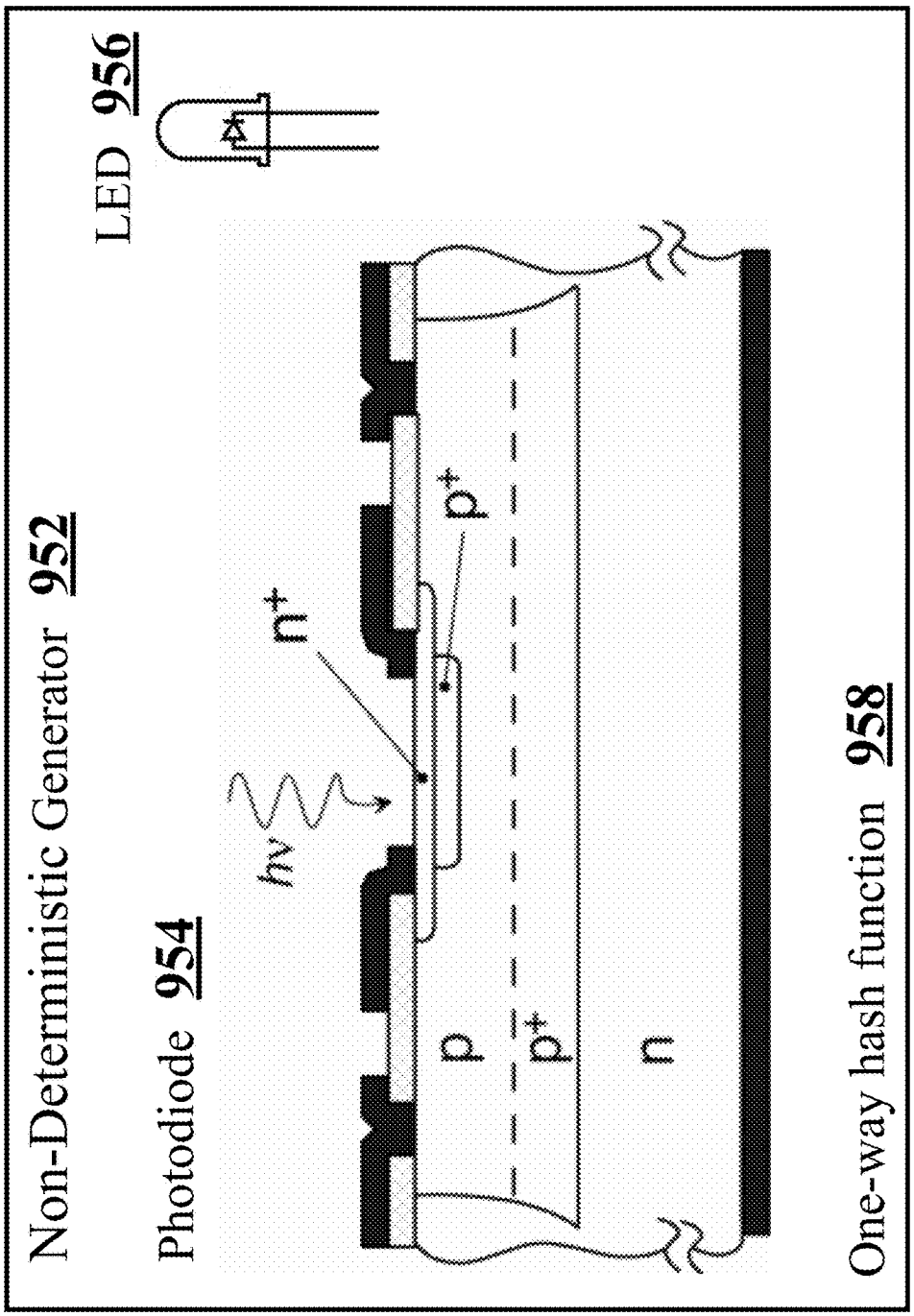
FIG. 9B shows an embodiment of a non-deterministic generator, based on quantum randomness. Non-deterministic generator 952 is based on the behavior of photons to help generate noise and in some embodiments one or more keys.
Figure 9C:
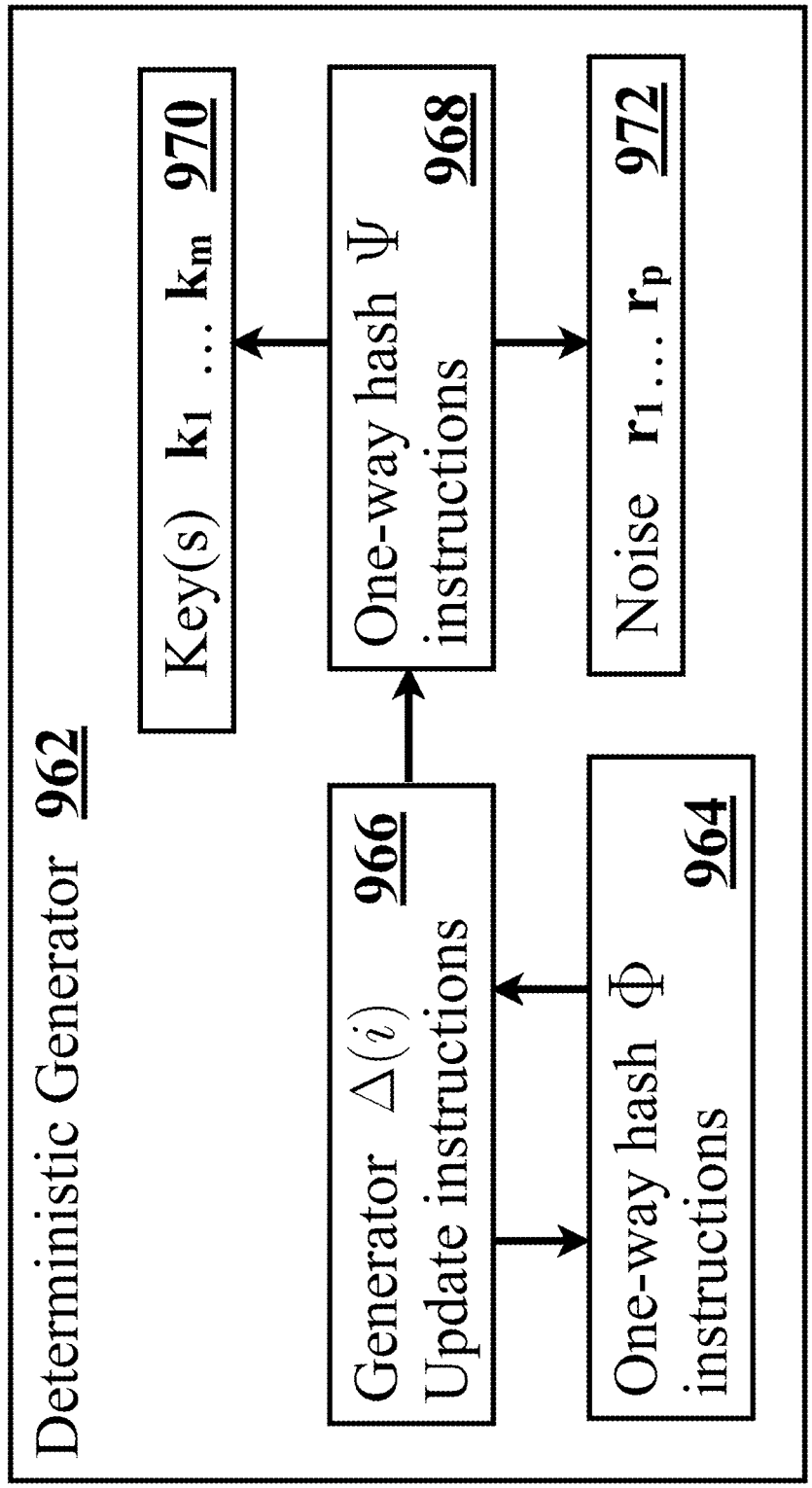

FIG. 9C shows an embodiment of a deterministic generator 962, implemented with a machine. Deterministic generator 962 may generate one or more keys 970 or noise 972. Deterministic generator 962 has generator update instructions 966, one-way hash instructions 964 and one-way hash instructions 968.

Figure 10:
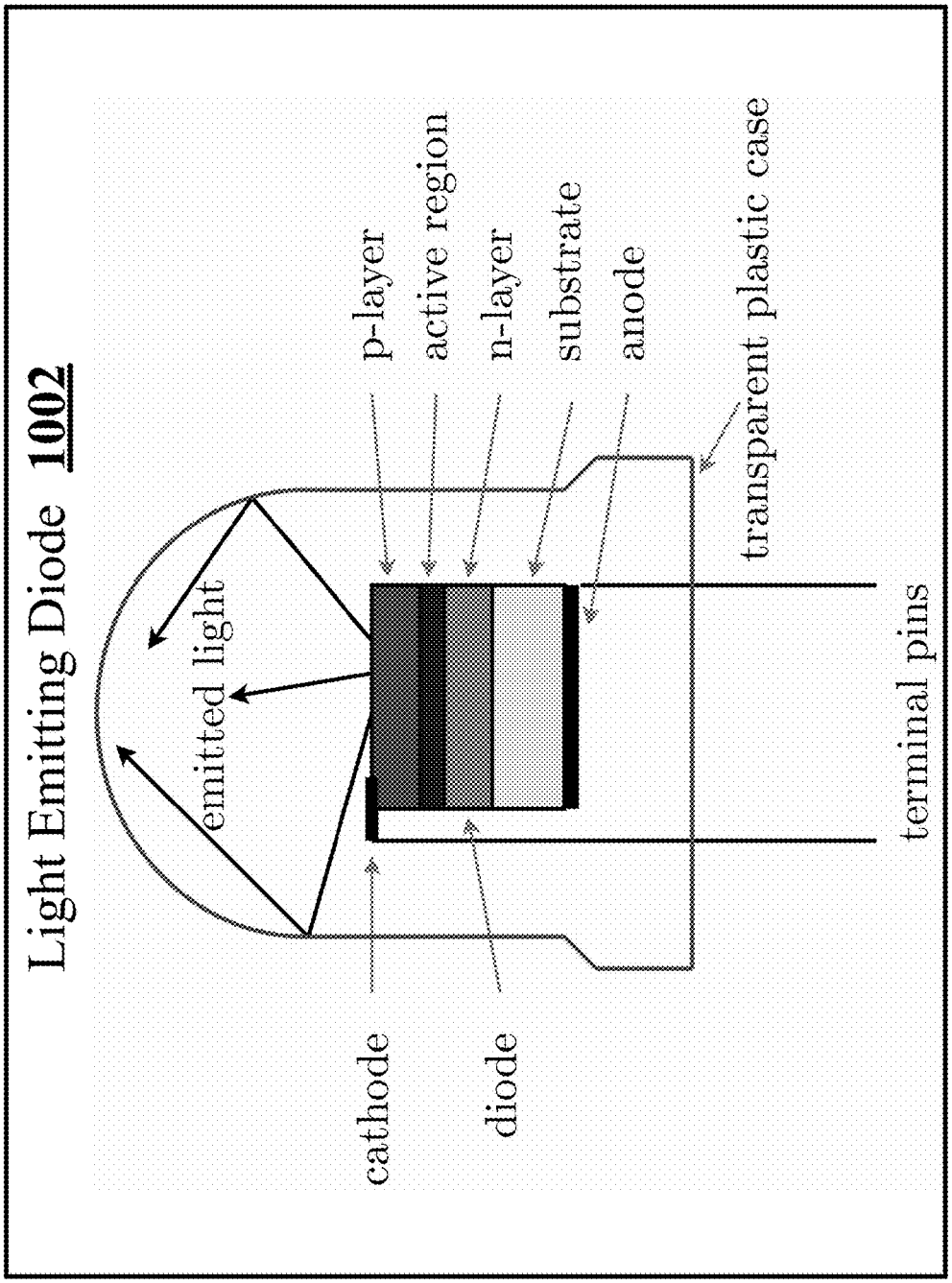

FIG. 10 shows a light emitting diode, which emits photons and in some embodiments is part of the random number generator. The light emitting diode contains a cathode, a diode, an anode, one terminal pin connected to the cathode and one terminal pin connected to the anode, a p-layer of semiconductor, an active region, an n-layer of semiconductor, a substrate and a transparent plastic case.

FIG. 11 shows the hiding of 512 bits of public key in 1024 bits of random noise.

FIG. 12 shows the extraction of 512 bits of public key that are hidden in 1024 bits of random noise.

Table 1 shows probabilities after Eve observes a hidden key or hidden data inside random noise. The hidden key or hidden noise is represented as $\mathcal{S}$.

DETAILED DESCRIPTION

7.1 Information System

In this specification, the term "public key" refers to any kind of public key used in public key cryptography. In an embodiment, "public key" refers to an RSA public key. In an embodiment, "public key" refers to an elliptic curve public key. In an embodiment, "public key" refers to a lattice public key.

In this specification, the term "noise" is information that is distinct from the public key(s) and has a different purpose. Noise is information that helps hide the public key(s) so that the noise hinders the adversary Eve from finding or obtaining the public key(s). This hiding of the public key(s) helps the privacy. In some embodiments, hiding the public key(s) means rearranging or permuting the public key(s) inside the noise. Hiding a public key inside noise helps protect the privacy of the key; the public key may subsequently help execute a cryptographic algorithm by a first party (e.g., Alice) or a second party (e.g., Bob).

In this specification, the term "location" may refer to geographic locations and/or storage locations. A particular storage location may be a collection of contiguous and/or noncontiguous locations on one or more machine readable media. Two different storage locations may refer to two different sets of locations on one or more machine-readable media in which the locations of one set may be intermingled with the locations of the other set.

In this specification, the term "machine-readable medium" refers to any non-transitory medium capable of carrying or conveying information that is readable by a machine. One example of a machine-readable medium is a computer-readable medium. Another example of a machine-readable medium is paper having holes that are detected that trigger different mechanical, electrical, and/or logic responses. The term machine-readable medium also includes media that carry information while the information is in transit from one location to another, such as copper wire and/or optical fiber and/or the atmosphere and/or outer space.

In this specification, the term "process" refers to a series of one or more operations. In an embodiment, "process" may also include operations or effects that are best described as non-deterministic. In an embodiment, "process" may include some operations that can be executed by a digital computer program and some physical effects that are non-deterministic, which cannot be executed by a digital computer program and cannot be performed by a finite sequence of processor instructions.

In this specification, the machine-implemented processes implement algorithms and non-deterministic processes on a machine. The formal notion of "algorithm" was introduced in Turing's work [7] and refers to a finite machine that executes a finite number of instructions with finite memory. In other words, an algorithm can be executed with a finite number of machine instructions on a processor. "Algorithm" is a deterministic process in the following sense: if the finite machine is completely known and the input to the machine is known, then the future behavior of the machine can be determined. In contrast, there is hardware that can measure quantum effects from photons (or other physically non-deterministic processes), whose physical process is non-deterministic. The recognition of non-determinism produced by quantum randomness and other quantum embodiments is based on decades of experimental evidence and statistical testing. Furthermore, the quantum theory—derived from the Kochen-Specker theorem and its extensions [8, 9]—predicts that the outcome of a quantum measurement cannot be known in advance and cannot be generated by a Turing machine (digital computer program). As a consequence, a physically non-deterministic process cannot be generated by an algorithm: namely, a sequence of operations executed by a digital computer program. FIG. 9A shows an embodiment of a non-deterministic process arising from quantum events; that is, the emission and absorption of photons.

Some examples of physically non-deterministic processes are as follows. In some embodiments that utilize non-determinism, photons strike a semitransparent mirror and can take two or more paths in space. In one embodiment, if the photon is reflected by the semitransparent mirror, then it takes on one bit value $b \in \{0, 1\}$; if the photon passes through by the semitransparent mirror, then the non-deterministic process produces another bit value 1−b. In another embodiment, the spin of an electron may be sampled to generate the next non-deterministic bit. In still another embodiment, a protein, composed of amino acids, spanning a cell membrane or artificial membrane, that has two or more conformations can be used to detect non-determinism: the protein conformation sampled may be used to generate a non-deterministic value in $\{0, \ldots n-1\}$ where the protein has n distinct conformations. In an alternative embodiment, one or more rhodopsin proteins could be used to detect the arrival times of photons and the differences of arrival times could generate non-deterministic bits. In some embodiments, a Geiger counter may be used to sample non-determinism.

In this specification, the term "photodetector" refers to any type of device or physical object that detects or absorbs photons. A photodiode is an embodiment of a photodetector. A phototransistor is an embodiment of a photodetector. A rhodopsin protein is an embodiment of a photodetector.

In this specification, the term "key" is a type of information and is a value or collection of values to which one or more operations are performed. In some embodiments, one or more of these operations are cryptographic operations. $\{0, 1\}^n$ is the set of all bit-strings of length n. When a public key is represented with bits, mathematically a n-bit key is an element of the collection $\{0, 1\}^n$ which is the collection of strings of 0's and 1's of length n. For example, the string of 0's and 1's that starts after this colon is a 128-bit key:

01100001 11000110 01010011 01110001 11000101
10001110 11011001 11010101 01011001 01100100
10110010 10101010 01101101 10000111 10101011
00010111. In an embodiment, n=3000 so that a key is a string of 3000 bits.

In other embodiments, a public key may be a sequence of values that are not represented as bits. Consider the set {A, B, C, D, E}. For example, the string that starts after this colon is a 40-symbol key selected from the set {A, B, C, D, E}: ACDEB AADBC EAEBB AAECB ADDCB BDCCE ACECB EACAE. In an embodiment, a key could be a string of length n selected from $\{A, B, C, D, E\}^n$. In an embodiment, n=700 so that the key is a string of 700 symbols where each symbol is selected from {A, B, C, D, E}.

Figure 1A:
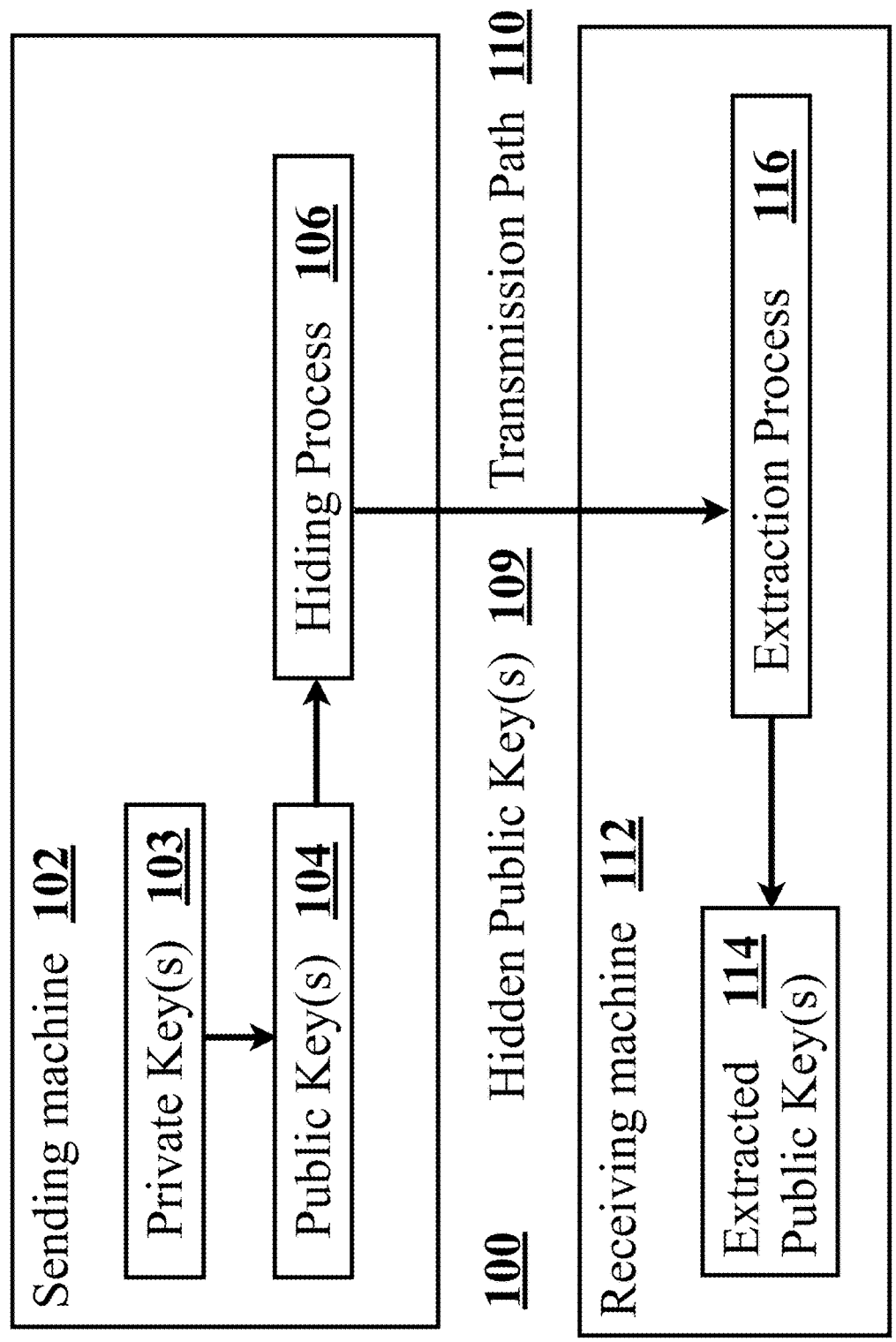
FIG. 1A shows an embodiment of an information system for sending and receiving hidden public keys.
Figure 1B:
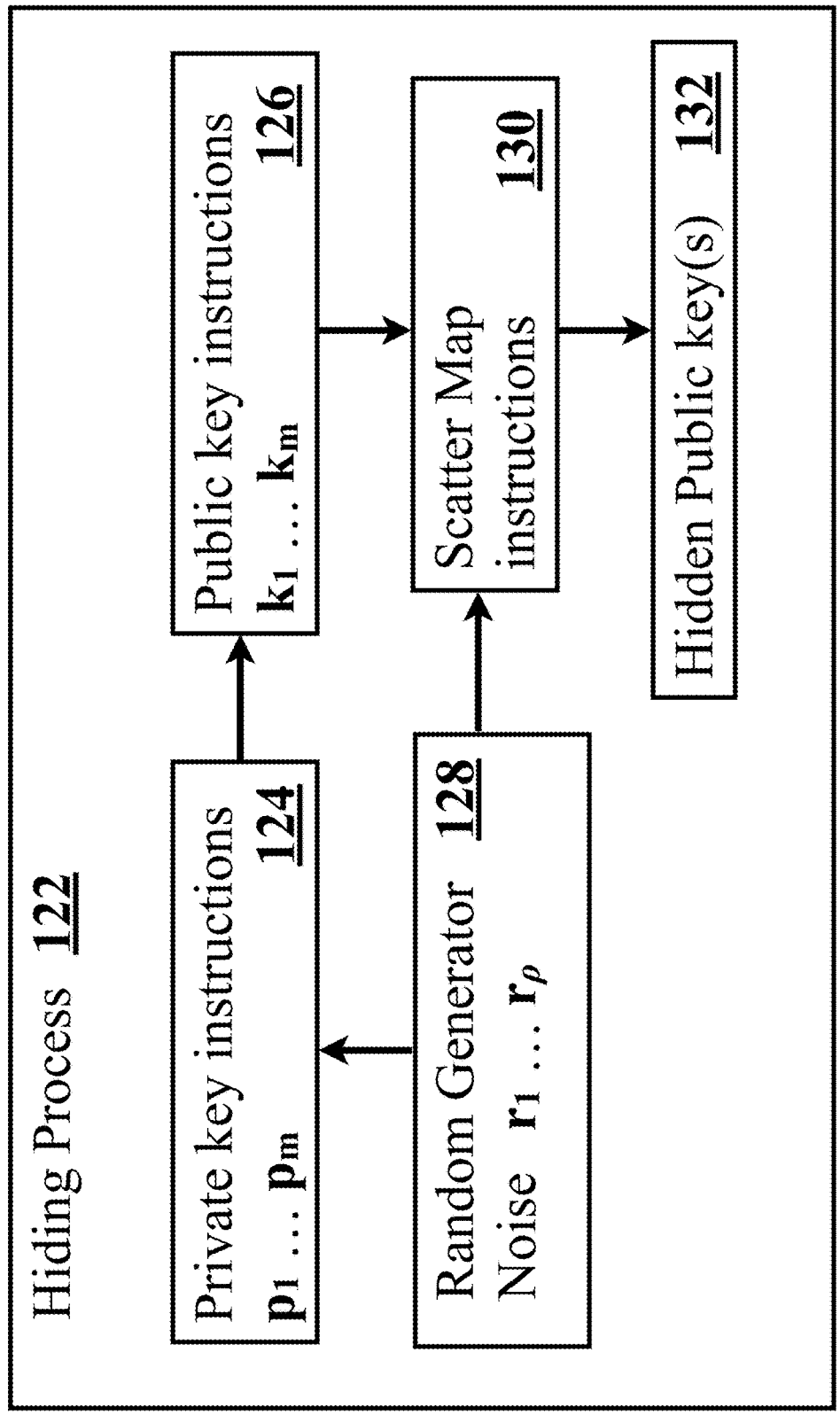
FIG. 1B shows an embodiment of a process for hiding public keys that can be used in the embodiment of FIG. 1A.
Figure 2A:
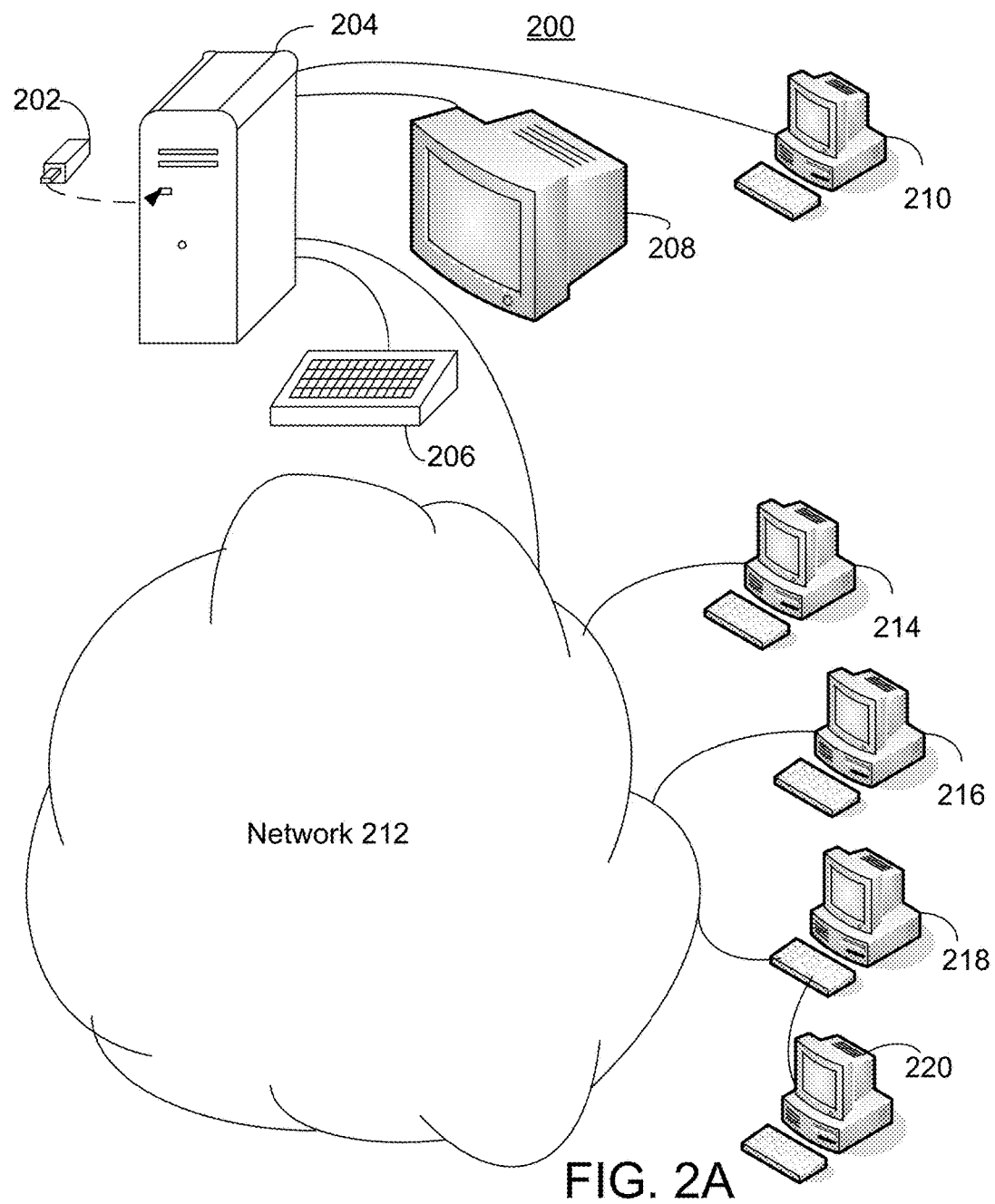
FIG. 2A shows an embodiment of a computer network transmitting hidden public keys. In some embodiments, the transmission may be over the Internet or a part of a network that supports an infrastructure such as the electrical grid, a financial exchange, or a power plant, which can be used with the embodiment of FIG. 1A.
Figure 2B:
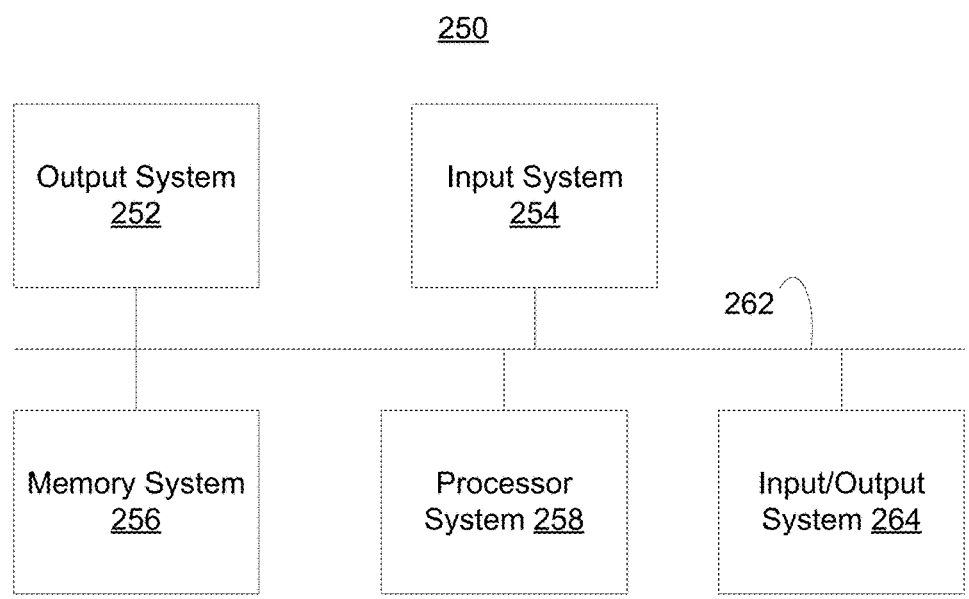
FIG. 2B shows an embodiment of a secure computing area for computing and hiding public keys, which includes a processor, memory and input/output system, which may be the sending and/or receiving machines of FIG. 1A.

In some embodiments, hidden public key(s) 109 in FIG. 1A may be read as input by processor system 258 in FIG. 2B, that executes instructions which perform extraction process 116 in FIG. 1A. In some embodiments, hidden public key(s) 132 in FIG. 1B, may be read as input by processor system 258, that executes instructions which perform extraction process 116.

In some embodiments, public key(s) 104 are RSA public key(s), which is a well-known public key cryptography [10]. RSA is described from the perspective of Alice. Alice chooses two huge primes $p_A$ and $q_A$. Alice computes $n_A=p_A q_A$ and a random number $r_A$ which has no common factor with $(p_A-1)(q_A-1)$. In other words, 1 is the greatest common divisor of $r_A$ and $(p_A-1)(q_A-1)$. The Euler-phi function is defined as follows. If k=1, then $\phi(k)=1$; if k>1, then $\phi(k)$ is the number positive integers i such that i<k and i and k are relatively prime. Relatively prime means the greatest common divisor of i and k is 1. The positive integer $e_A$ is randomly selected such that $e_A$ is relatively prime to $\phi(n_A)$.

Alice computes $\phi(n_A)=n_A+1-p_A-q_A$. Alice computes the multiplicative inverse of $r_A$ modulo $\phi(n_A)$; the multiplicative inverse is $d_A=e_A^{-1}$ modulo $\phi(n_A)$. Alice makes public her public key $(n_A, r_A)$: that is, the two positive integers $(n_A, r_A)$ are Alice's public key.

In an embodiment, random generator 128 generates $r_1 \ldots r_\rho$ which is input to private key instructions 124. In an embodiment that hides RSA public keys, private key instruction 124 use $r_1 \ldots r_\rho$ to find two huge primes $p_A$ and $q_A$ and a random number $r_A$ relatively prime to $(p_A-1)(q_A-1)$.

In an embodiment, random generator 128 and private key instructions 124 generate two huge primes $p_A$ and $q_A$; compute $n_A=p_A q_A$; and randomly choose $e_A$ that is relatively prime to $\phi(n_A)$. In an embodiment, private key instructions 124 compute $d_A=e_A^{-1}$ modulo $\phi(n_A)$. In an embodiment, an RSA private key is $(n_A, d_A)$. In an embodiment that hides RSA public keys, public key instructions 126 compute RSA public key $(n_A, r_A)$. In an embodiment, positive integer $n_A$ is a string of 4096 bits and $r_A$ is a string of 4096 bits.

FIG. 1A shows an information system 100 for hiding public keys in a manner that is expected to be secure. In this specification, open public key will sometimes refer to a public key that has not yet been hidden and extracted public key will refer to a public key that was previously hidden and extracted from the noise. Information system 100 includes one or more private keys 103 and one or more corresponding public keys 104, and hiding process 106, a sending machine 102, hidden key(s) 109 and a transmission path 110, a receiving machine 112, extraction process 116, extracted public key(s) 114. In other embodiments, information system 100 may not have all of the components listed above or may have other components instead of and/or in addition to those listed above.

Information system 100 may be a system for transmitting hidden public key(s). Public key(s) 104 refers to information that has a purpose and that has not been hidden yet. In some embodiments, public key(s) 104 is intended to be delivered to another location, software unit, machine, person, or other entity.

In some embodiments, public key(s) 104 may serve as part of a key exchange that has not yet been hidden. In an embodiment, public key(s) 104 may be unhidden information before it is hidden and transmitted wirelessly between satellites. Public key(s) 104 may be represented in analog form in some embodiments and may be represented in digital form. In an embodiment, the public key(s) may be one or more RSA public keys based on huge prime numbers. In an another embodiment, the public key(s) may be one or more elliptic curve public keys, computed from an elliptic curve over a finite field.

In information system 100, noise helps hide public key(s) 104. Although they are public, it may be desirable to keep public key(s) 104 private or secret from Eve. For example, it is known that Shor's quantum computing algorithm [33] can compute in polynomial time the corresponding private key of a RSA public key. As another example, an analogue of Shor's algorithm [34] can compute in polynomial time the corresponding private key of an elliptic curve public key. If Eve has a quantum computer that computes enough qubits, then Eve could find the private key of an RSA public key that is disclosed to Eve and consequently breach the security of information system 100. One or more RSA public keys could be hidden in noise to protect them from Eve's quantum computer. Consequently, it may be desirable to hide public key(s) 104, so that the transmitted information is expected to be unintelligible to an unintended recipient should the unintended recipient attempt to read and/or extract the hidden public key(s) 109 transmitted. Public key(s) 104 may be a collection of multiple, not yet hidden blocks of information, an entire sequence of public keys, a segment of public keys, or any other portion of one or more public keys. When there is more than one public key, public keys 104 may be computed from distinct commutative groups, as described in section 7.6. For example, one commutative group may be based on an elliptic curve over a finite field; another commutative group may be based on multiplication modulo, as used in RSA.

Hiding process 106 may be a series of steps that are performed on public keys 104. In one embodiment, the term "process" refers to one or more instructions for sending machine 102 to execute the series of operations that may be stored on a machine-readable medium. Alternatively, the process may be carried out by and therefore refer to hardware (e.g., logic circuits) or may be a combination of instructions stored on a machine-readable medium and hardware that cause the operations to be executed by sending machine 102 or receiving machine 112. Public key(s) 104 may be input for hiding process 106. The steps that are included in hiding process 106 may include one or more mathematical operations and/or one or more other operations.

As a post-processing step, one-way hash function 948 may be applied to a sequence of random events such as quantum events (non-deterministic) generated by non-deterministic generator 942 in FIG. 9A. As a post-processing step, one-way hash function 948 may be applied to a sequence of random events such as quantum events (non-deterministic) generated by non-deterministic generator 952 in FIG. 9B.

In FIG. 1B hiding process 122 may implement hiding process 106 in FIG. 1A. In some embodiments, random generator 128 help generate noise that is used by scatter map process instructions 130. In some embodiments, hiding process 122 requests random generator 128 and private key instructions 124 to help generate one or more private keys 103 that are used to compute public keys 104. In an embodiment, non-deterministic generator 942 (FIG. 9A) may be part of random generator 128. In an embodiment, non-deterministic generator 952 (FIG. 9B) may be part of random generator 128.

Sending machine 102 may be an information machine that handles information at or is associated with a first location, software unit, machine, person, sender, or other entity. Sending machine 102 may be a computer, a phone, a mobile phone, a telegraph, a satellite, or another type of electronic device, a mechanical device, or other kind of machine that sends information. Sending machine 102 may include one or more processors and/or may include specialized circuitry for handling information. Sending machine 102 may receive public key(s) 104 from another source (e.g., a transducer such as a microphone which is inside mobile phone 402 or 502 of FIG. 4), may produce all or part of public key(s) 104, may implement hiding process 106, and/or may transmit the output to another entity. In another embodiment, sending machine 102 receives public key(s) 104 from another source, while hiding process 106 and the delivery of the output of hiding process 106 are implemented manually. In another embodiment, sending machine 102 implements hiding process 106, having public key(s) 104 entered, via a keyboard (for example) or via a mobile phone microphone, into sending machine 102. In another embodiments, sending machine 102 receives output from hiding process 106 and sends the output to another entity.

Sending machine 102 may implement any of the hiding processes described in this specification. Hiding process 106 may include any of the hiding processes described in this specification. For example, hiding process 106 may implement any of the embodiments of the hiding processes 1 in section 7.7 and processes 2, 3 in section 7.11.

In some embodiments, hiding process 122, shown in FIG. 1B, generates one or more private keys $p_1, \ldots p_m$ from private key instructions 124 and random generator 128; computes one or more public keys $k_1, \ldots k_m$ with public key instructions 126; and scatter map instructions 130 hide one or public keys in noise $r_1 \ldots r_\rho$ generated from random generator 128.

Transmission path 110 is the path taken by hidden public key(s) 109 to reach the destination to which hidden public key(s) 109 was sent. Transmission path 110 may include one or more networks, as shown in FIG. 2A. In FIG. 2A, network 212 may help support transmission path 110. For example, transmission path 110 may be the Internet, which is implemented by network 212; for example, transmission path 110 may be wireless using voice over Internet protocol, which is implemented by network 212. Transmission path 110 may include any combination of any of a direct connection, hand delivery, vocal delivery, one or more Local Area Networks (LANs), one or more Wide Area Networks (WANs), one or more phone networks, including paths under the ground via fiber optics cables and/or one or more wireless networks, and/or wireless inside and/or outside the earth's atmosphere.

Receiving machine 112 may be an information machine that handles information at the destination of an hidden public key(s) 109. Receiving machine 112 may be a computer, a phone, a telegraph, a router, a satellite, or another type of electronic device, a mechanical device, or other kind of machine that receives information. Receiving machine 112 may include one or more processors and/or specialized circuitry configured for handling information, such as hidden public key(s) 109. Receiving machine 112 may receive hidden public key(s) 109 from another source and/or reconstitute (e.g., extract) all or part of hidden public key(s) 109. Receiving machine 112 may implement any of the hiding processes described in this specification and is capable of extracting any message hidden by sending machine 102 and hiding process 106.

In one embodiment, receiving machine 112 only receives hidden public key 109 from transmission path 110, while hiding process 106 is implemented manually and/or by another information machine. In another embodiment, receiving machine 112 implements extraction process 116 that reproduces all or part of public key(s) 104, referred to as extracted public key(s) 114 in FIG. 1A. In another embodiment, receiving machine 112 receives hidden public key(s) 109 from transmission path 110, and reconstitutes all or part of extracted public key(s) 114 using extraction process 116. Extraction process 116 may store any of the processes of hiding information described in this specification. Extraction process 116 may include any of the hiding processes described in this specification Receiving machine 112 may be identical to sending machine 102. For example, receiving machine 112 may receive 104 from another source, produce all or part of public key(s) 104, and/or implement hiding process 106. Similar to sending machine 102, receiving machine 112 may create keys and random noise and random public key(s). Receiving machine 112 may transmit the output of extraction process 116, via transmission path 110 to another entity and/or receive hidden public key(s) 109 (via transmission path 110) from another entity. Receiving machine 112 may present hidden public key(s) 109 for use as input to extraction process 116.

7.2 Processor, Memory and Input/Output Hardware

Figure 3A:
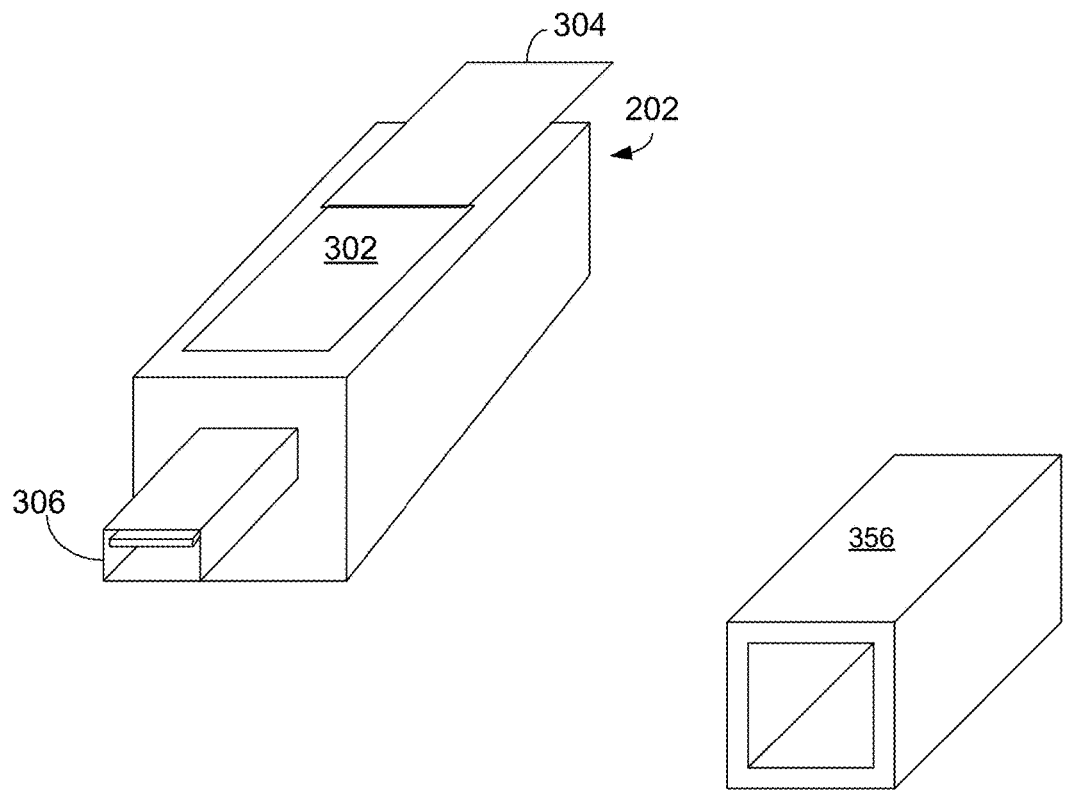
FIG. 3A shows an embodiment of a USB drive that can act as a sending machine and receiving machine to store and protect a user's information.
Figure 3B:
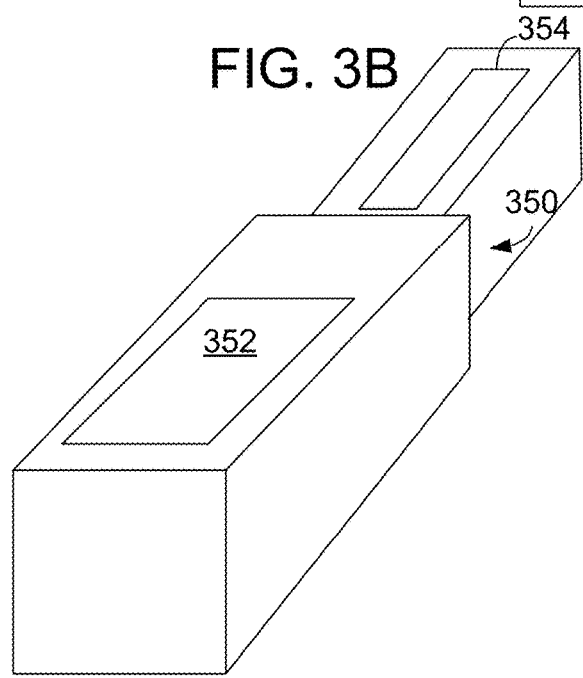
FIG. 3B shows an embodiment of an authentication token, which may include the sending and/or receiving machines of FIG. 1A, that contains a computer processor that can hide public keys.
Figure 4:
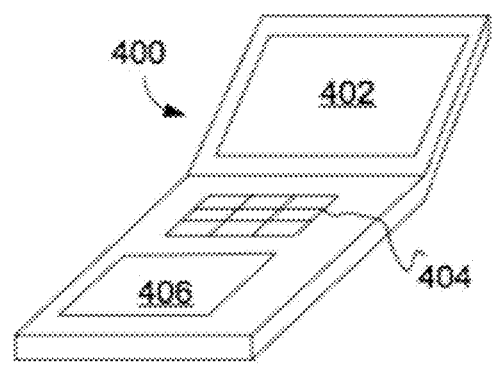
FIG. 4 shows a mobile phone embodiment 400 that hides public keys and transmits them wirelessly. Mobile phone embodiment 400 may include the sending and/or receiving machines of FIG. 1A.

Information system 200 illustrates some of the variations of the manners of implementing information system 100. Sending machine 202 is one embodiment of sending machine 101. Sending machine 202 may be a secure USB memory storage device as shown in 3A. Sending machine 202 may be an authentication token as shown in FIG. 3B. A mobile phone embodiment of sending machine 202 is shown in FIG. 4.

Sending machine 202 or sending machine 400 may communicate wirelessly with computer 204. In an embodiment, computer 204 may be a call station for receiving hidden public key 109 from sending machine 400. A user may use input system 254 and output system 252 of sending machine (mobile phone) 400 to transmit hidden public key to a receiving machine that is a mobile phone. In an embodiment, input system 254 in FIG. 2B includes a microphone that is integrated with sending machine (mobile phone) 400. In an embodiment, output system 252 in FIG. 2B includes a speaker that is integrated with sending machine (mobile phone) 400. In another embodiment, sending machine 202 is capable of being plugged into and communicating with computer 204 or with other systems via computer 204.

Computer 204 is connected to system 210, and is connected, via network 212, to system 214, system 216, and system 218, which is connected to system 220. Network 212 may be any one or any combination of one or more Local Area Networks (LANs), Wide Area Networks (WANs), wireless networks, telephones networks, and/or other networks. System 218 may be directly connected to system 220 or connected via a LAN to system 220. Network 212 and system 214, 216, 218, and 220 may represent Internet servers or nodes that route hidden public key(s) 109 received from sending machine 400 shown in FIG. 4. In FIG. 2A, system 214, 216, 218, and system 220 and network 212 may together serve as a transmission path 110 for hidden public key(s) 109. In an embodiment, system 214, 216, 218, and system 220 and network 212 may execute the Internet protocol stack in order to serve as transmission path 110 for hidden public key 109. In an embodiment, hidden public key(s) 109 may be one or more public keys computed from elliptic curve computations over a finite field. In an embodiment, hidden public key 109 may sent via TCP/IP or UDP. In an embodiment, hidden public key 109 may be sent by email. In an embodiment, hidden public key 109 may be represented as ASCII text sent from sending machine 400.

In FIG. 1B, hiding process 122 may be implemented by any of, a part of any of, or any combination of any of system 210, network 212, system 214, system 216, system 218, and/or system 220. As an example, routing information of transmission path 110 may be hidden with hiding process 122 that executes in system computer 210, network computers 212, system computer 214, system computer 216, system computer 218, and/or system computer 220. Hiding process 106 may be executed inside sending machine 400 and extraction process 116 may be executed inside receiving machine 400 in FIG. 4.

In an embodiment, hiding process 106 and extraction process 116 execute in a secure area of processor system 258 of FIG. 2B. In an embodiment, specialized hardware in processor system 258 may be implemented to speed up the computation of scatter map instructions 130 in FIG. 1B. In an embodiment, this specialized hardware in processor system 258 may be embodied as an ASIC (application specific integrated circuit) that computes SHA-1 and/or SHA-512 and/or Keccak and/or BLAKE and/or JH and/or Skein that help execute one-way hash function 948 in non-deterministic generator 942 or one-way hash function 958 in non-deterministic generator 952 or one-way hash instructions 964 in deterministic generator 962.

In an embodiment, specialized hardware in processor system 258 may be embodied as an ASIC (application specific integrated circuit) that computes SHA-1 and/or SHA-512 and/or Keccak and/or BLAKE and/or JH and/or Skein that help execute the HMAC function in processes 2 and 2 in section 7.11. An ASIC chip can increase the execution speed and protect the privacy of hiding process 106 and extraction process 116.

In an embodiment, input system 254 of FIG. 2B receives public key(s) 104 and processor system 258 hides them with hiding process 122. Output system 252 sends the hidden public key(s) 109 to a telecommunication network 212. In an embodiment, memory system 256 stores private key instructions 124, public key instructions 126 and scatter map instructions 130.

In an embodiment, memory system 256 of FIG. 2B stores scatter map instructions 132. In an embodiment, memory system 256 stores hidden public key(s) 109 that is waiting to be sent to output system 252 and sent out along transmission path 110, routed and served by system computers 210, 214, 216, 218 and 220 and network 212.

7.3 Non-Deterministic Generators

FIG. 9A shows an embodiment of a non-deterministic generator 942 arising from quantum events: that is, random noise generator uses the emission and absorption of photons for its non-determinism. In FIG. 9A, phototransistor 944 absorbs photons emitted from light emitting diode 954. In an embodiment, the photons are produced by a light emitting diode 946. In FIG. 9B, non-deterministic generator 952 has a photodiode 954 that absorbs photons emitted from light emitting diode 956. In an embodiment, the photons are produced by a light emitting diode 956.

FIG. 10 shows a light emitting diode (LED) 1002. In an embodiment, LED 1002 emits photons and is part of the non-deterministic generator 942 (FIG. 9A). In an embodiment, LED 1002 emits photons and is part of the non-deterministic generator 952 (FIG. 9B). LED 1002 contains a cathode, a diode, an anode, one terminal pin connected to the cathode and one terminal pin connected to the anode, a p-layer of semiconductor, an active region, an n-layer of semiconductor, a substrate and a transparent plastic case. The plastic case is transparent so that a photodetector outside the LED case can detect the arrival times of photons emitted by the LED. In an embodiment, photodiode 944 absorbs photons emitted by LED 1002. In an embodiment, phototransistor 954 absorbs photons emitted by LED 1002.

The emission times of the photons emitted by the LED experimentally obey the energy-time form of the Heisenberg uncertainty principle. The energy-time form of the Heisenberg uncertainty principle contributes to the non-determinism of random noise generator 142 because the photon emission times are unpredictable due to the uncertainty principle. In FIGS. 9A and 9B, the arrival of photons are indicated by a squiggly curve with an arrow and hv next to the curve. The detection of arrival times of photons is a non-deterministic process. Due to the uncertainty of photon emission, the arrival times of photons are quantum events.

In FIGS. 9A and 9B, hA refers to the energy of a photon that arrives at photodiode 944, respectively, where h is Planck's constant and v is the frequency of the photon. In FIG. 9A, the p and n semiconductor layers are a part of a phototransistor 944, which generates and amplifies electrical current, when the light that is absorbed by the phototransistor. In FIG. 9B, the p and n semiconductor layers are a part of a photodiode 954, which absorbs photons that strike the photodiode.

A photodiode is a semiconductor device that converts light (photons) into electrical current, which is called a photocurrent. The photocurrent is generated when photons are absorbed in the photodiode. Photodiodes are similar to standard semiconductor diodes except that they may be either exposed or packaged with a window or optical fiber connection to allow light (photons) to reach the sensitive part of the device. A photodiode may use a PIN junction or a p-n junction to generate electrical current from the absorption of photons. In some embodiments, the photodiode may be a phototransistor.

A phototransistor is a semiconductor device comprised of three electrodes that are part of a bipolar junction transistor. Light or ultraviolet light activates this bipolar junction transistor. Illumination of the base generates carriers which supply the base signal while the base electrode is left floating. The emitter junction constitutes a diode, and transistor action amplifies the incident light inducing a signal current.

When one or more photons with high enough energy strikes the photodiode, it creates an electron-hole pair. This phenomena is a type of photoelectric effect. If the absorption occurs in the junction's depletion region, or one diffusion length away from the depletion region, these carriers (electron-hole pair) are attracted from the PIN or p-n junction by the built-in electric field of the depletion region. The electric field causes holes to move toward the anode, and electrons to move toward the cathode; the movement of the holes and electrons creates a photocurrent. In some embodiments, the amount of photocurrent is an analog value, which can be digitized by a analog-to-digital converter. In some embodiments, the analog value is amplified before being digitized. The digitized value is what becomes the random noise. In some embodiments, a one-way hash function 948 or 958 may also be applied to post-process the raw random noise to produce noise $r_1 r_2 \ldots r_\rho$ used by processes 1, 2 and 3. In some embodiments, a one-way hash function may be applied using one-way hash instructions 964 to the random noise before executing private key(s) instructions 124, used by processes 1, 2 and 3.

In an embodiment, the sampling of the digitized photocurrent values may converted to threshold times as follows. A photocurrent threshold θ is selected as a sampling parameter. If a digitized photocurrent value $i_1$ is above θ at time $t_1$, then $t_1$ is recorded as a threshold time. If the next digitized photocurrent value $i_2$ above θ occurs at time $t_2$, then $t_2$ is recorded as the next threshold time. If the next digitized value $i_3$ above θ occurs at time $t_3$, then $t_3$ is recorded as the next threshold time.

After three consecutive threshold times are recorded, these three times can determine a bit value as follows. If $t_2-t_1 > t_3-t_2$, then random noise generator produces a 1 bit. If $t_2-t_1 < t_3-t_2$, then random noise generator produces a 0 bit. If $t_2-t_1 = t_3-t_2$, then no noise information is produced. To generate the next bit, random noise generator 942 or 952 continues the same sampling steps as before and three new threshold times are produced and compared.

In an alternative sampling method, a sample mean μ is established for the photocurrent, when it is illuminated with photons. In some embodiments, the sampling method is implemented as follows. Let $i_1$ be the photocurrent value sampled at the first sampling time. $i_1$ is compared to μ. ε is selected as a parameter in the sampling method that is much smaller number than μ. If $i_1$ is greater than μ+ε, then a 1 bit is produced by the random noise generator 942 or 952. If $i_1$ is less than μ−ε, then a 0 bit is produced by random noise generator 942 or 952. If $i_1$ is in the interval [μ−ε, μ+ε], then NO bit is produced by random noise generator 942 or 952.

Let $i_2$ be the photocurrent value sampled at the next sampling time. $i_2$ is compared to μ. If $i_2$ is greater than μ+ε, then a 1 bit is produced by the random noise generator 942 or 952. If $i_2$ is less than μ−ε, then a 0 bit is produced by the random noise generator 942 or 952. If $i_2$ is in the interval [μ−ε, μ+ε], then NO bit is produced by the random noise generator 942 or 952. This alternative sampling method continues in the same way with photocurrent values $i_3$, $i_4$, and so on. In some embodiments, the parameter ε is selected as zero instead of a small positive number relative to μ.

Some alternative hardware embodiments of non-deterministic generator 128 (FIG. 1B) are described below. In some embodiments that utilize non-determinism to produce random noise, a semitransparent mirror may be used. In some embodiments, the mirror contains quartz (glass). The photons that hit the mirror may take two or more paths in space. In one embodiment, if the photon is reflected, then the random noise generator creates the bit value b∈{0, 1}; if the photon is transmitted, then the random noise generator creates the other bit value 1−b. In another embodiment, the spin of an electron may be sampled to generate the next non-deterministic bit. In still another embodiment of a random noise generator, a protein, composed of amino acids, spanning a cell membrane or artificial membrane, that has two or more conformations can be used to detect non-determinism: the protein conformation sampled may be used to generate a random noise value in {0, . . . n−1} where the protein has n distinct conformations. In an alternative embodiment, one or more rhodopsin proteins could be used to detect the arrival times $t_1 < t_2 < t_3$ of photons and the differences of arrival times ($t_2-t_1 > t_3-t_2$ versus $t_2-t_1 < t_3-t_2$) could generate non-deterministic bits that produce random noise.

In some embodiments, the seek time of a hard drive can be used as random noise values as the air turbulence in the hard drive affects the seek time in a non-deterministic manner. In some embodiments, local atmospheric noise can be used as a source of random noise. For example, the air pressure, the humidity or the wind direction could be used. In other embodiments, the local sampling of smells based on particular molecules could also be used as a source of random noise.

In some embodiments, a Geiger counter may be used to sample non-determinism and generate random noise. In these embodiments, the unpredictability is due to radioactive decay rather than photon emission, arrivals and detection.

7.4 Deterministic Generators

In an embodiment, a deterministic generator 962 (FIG. 9C) is implemented with a machine. In an embodiment, machine 1 generates noise 972 as follows. Φ is one-way hash function with digest size d and is executed with one-way hash instructions 964. In some embodiments, Ψ is a one-way hash function with digest size at least p bits (noise size) and is executed with one-way hash instructions 968. In some embodiments, if ρ is greater than digest size of Ψ, then the generator update steps in machine 1 may be called more than once to generate enough noise.

In some embodiments, Φ and Ψ are the same one-way hash functions. In other embodiments, Φ and Ψ are different one-way hash functions. In an embodiment, Φ is one-way hash function SHA-512 and Ψ is one-way hash function Keccak. In another embodiment, Φ is one-way hash function Keccak and Ψ is one-way hash function SHA-512.

In an embodiment, the ith generator Δ(i) is composed of N bits and updated with generator update instructions 966. The N bits of Δ(i) are represented as $\Delta_{i,0} \Delta_{i,1} \ldots \Delta_{i,N-1}$ where each bit $\Delta_{i,j}$ is a 0 or 1. In an embodiment, generator update instructions 966 are executed according to the following two steps described in machine 1:

Update $(\Delta_{i+1,0} \Delta_{i+1,1} \ldots \Delta_{i+1,d-1}) = \Phi(\Delta_{i,0} \Delta_{i,1} \ldots \Delta_{i,d-1})$ Update $\Delta_{i+1,j} = \Delta_{i,j}$ for each j satisfying d≤j≤N−1

In an embodiment, the size of the deterministic generator N may be 1024. In another embodiment, N may be fifty thousand. In another embodiment, N may be ten billion.

In an embodiment, one-way hash instructions 964 are performed by processor system 258 (FIG. 1B). In an embodiment, one-way hash instructions 968 are performed by processor system 258 (FIG. 1B). In an embodiment, generator update instructions 966 are performed by processor system 258 (FIG. 1B). In an embodiment, memory system 256 stores one-way hash instructions 964, one-way hash instructions 968 and generator update instructions 966.

In an embodiment, the instructions that execute machine 1 and help execute deterministic generator 962 may expressed in the C programming language before compilation. In an embodiment, the instructions that execute machine 1 and help execute deterministic generator 962 may be expressed in the native machine instructions of processor system 258. In an embodiment, the instructions that execute machine 1 may be implemented as an ASIC, which is part of processor system 258.

Machine 1. Generating Noise with a Machine

0th generator state $\Delta(0) = \Delta_{0,0} \ldots \Delta_{0,N-1}$.
Initialize i = 0
while ( hiding process 122 requests more noise )
{
    Update $(\Delta_{i+1,0} \Delta_{i+1,1} \ldots \Delta_{i+1,d-1}) = \Phi(\Delta_{i,0} \Delta_{i,1} \ldots \Delta_{i,d-1})$
    Update $\Delta_{i+1,j} = \Delta_{i,j}$ for each j satisfying $d \leq j \leq N - 1$
    Increment i
    Generate noise 972 $r_1 r_2 \ldots r_\rho$ by executing one-way hash $\Psi$
    instructions 968 on generator state $\Delta(i)$ as input to $\Psi$, where noise $r_1$
    $r_2 \ldots r_\rho$ is the first $\rho$ bits of hash output $\Psi(\Delta_{i,0} \ldots \Delta_{i,N-1})$.
}

In an embodiment, machine 2 generates key(s) 970 as follows. $\Phi$ is one-way hash function with digest size d and is executed with one-way hash instructions 964. In some embodiment, $\Psi$ is a one-way hash function with digest size at least m bits (size of one or more keys) and is executed with one-way hash instructions 968. In some embodiments, if m is greater than digest size of $\Psi$, then the generator update steps in machine 2 may be called more than once to generate enough keys.

In some embodiments, $\Phi$ and $\Psi$ are the same one-way hash functions. In other embodiments, $\Phi$ and $\Psi$ are different one-way hash functions. In an embodiment, $\Phi$ is one-way hash function SHA-512 and $\Psi$ is one-way hash function Keccak. In another embodiment, $\Phi$ is one-way hash function Keccak and $\Psi$ is one-way hash function SHA-512.

In an embodiment, the ith generator $\Delta(i)$ is composed of N bits and updated with generator update instructions 966. The N bits of $\Delta(i)$ are represented as $\Delta_{i,0} \Delta_{i,1} \ldots \Delta_{i,N-1}$ where each bit $\Delta_{i,j}$ is a 0 or 1. In an embodiment, generator update instructions 966 are executed according to the following two steps described in machine 2:
Update $(\Delta_{i+1,0} \Delta_{i+1,1} \ldots \Delta_{i+1,d-1}) = (\Delta_{i,0} \Delta_{i,1} \ldots \Delta_{i,d-1})$
Update $\Delta_{i+1,j} = \Delta_{i,j}$ for each j satisfying $d \leq j \leq N-1$
In an embodiment, the size of the deterministic generator N may be 1024. In another embodiment, N may be fifty thousand. In another embodiment, N may be ten billion.

In an embodiment, one-way hash instructions 964 are performed by processor system 258 (FIG. 1B). In an embodiment, one-way hash instructions 968 are performed by processor system 258 (FIG. 1B). In an embodiment, generator update instructions 966 are performed by processor system 258 (FIG. 1B). In an embodiment, memory system 256 stores one-way hash instructions 964, one-way hash instructions 968 and generator update instructions 966.

In an embodiment, the instructions that execute machine 2 and help execute deterministic generator 962 may expressed in the C programming language before compilation. In an embodiment, the instructions that execute machine 2 and help execute deterministic generator 962 may be expressed in the native machine instructions of processor system 258. In an embodiment, the instructions that execute machine 2 may be implemented as an ASIC, which is part of processor system 258. In an embodiment, memory system 956 may store one or more keys 970.

Machine 2. Generating One or more Keys with a Machine

0th generator state $\Delta(0) = \Delta_{0,0} \ldots \Delta_{0,N-1}$.
Initialize i = 0
while( hiding process 122 requests more key(s) )
{
    Update generator $(\Delta_{i+1,0} \Delta_{i+1,1} \ldots \Delta_{i+1,d-1}) = \Phi(\Delta_{i,0} \Delta_{i,1} \ldots \Delta_{i,d-1})$.
    Update generator $\Delta_{i+1,j} = \Delta_{i,j}$ for each j satisfying $d \leq j \leq N - 1$ Machine 2. Generating One or more Keys with a Machine (-continued)

Increment i
    Generate key(s) 970 $k_1 k_2 \ldots k_m$ by executing one-way hash $\Psi$
    instructions 968 on generator state $\Delta(i)$ as input to $\Psi$, where $k_1$
    $k_2 \ldots k_m$ is the first m bits of hash output $\Psi(\Delta_{i,0} \ldots \Delta_{i,N-1})$.
}

7.5 One-Way Hash Functions

In FIG. 9, one-way hash function 148 may include one or more one-way functions. A one-way hash function $\Phi$, has the property that given an output value z, it is computationally intractable to find an information element $m_z$ such that $\Phi(m_z)=z$. In other words, a one-way function $\Phi$ is a function that can be easily computed, but that its inverse $\Phi^{-1}$ is computationally intractable to compute [11]. A computation that takes $10^{101}$ computational steps is considered to have computational intractability of $10^{101}$.

More details are provided on computationally intractable. In an embodiment, there is an amount of time T that encrypted information must stay secret. If encrypted information has no economic value or strategic value after time T, then computationally intractable means that the number of computational steps required by all the world's computing power will take more time to compute than time T. Let C(t) denote all the world's computing power at the time t in years.

Consider an online bank transaction that encrypts the transaction details of that transaction. Then in most embodiments, the number of computational steps that can be computed by all the world's computers for the next 30 years is in many embodiments likely to be computationally intractable as that particular bank account is likely to no longer exist in 30 years or have a very different authentication interface.

To make the numbers more concrete, the 2013 Chinese supercomputer that broke the world's computational speed record computes about 33,000 trillion calculations per second [12]. If T=1 one year and we can assume that there are at most 1 billion of these supercomputers. (This can be inferred from economic considerations, based on a far too low 1 million dollar price for each supercomputer. Then these 1 billion supercomputers would cost 1,000 trillion dollars.). Thus, $C(2014) \times 1$ year is less than $109 \times 33 \times 1015 \times 3600 \times 24 \times 365 = 1.04 \times 10^{33}$ computational steps.

As just discussed, in some embodiments and applications, computationally intractable may be measured in terms of how much the encrypted information is worth in economic value and what is the current cost of the computing power needed to decrypt that encrypted information. In other embodiments, economic computational intractability may be useless. For example, suppose a family wishes to keep their child's whereabouts unknown to violent kidnappers. Suppose T=100 years because it is about twice their expected lifetimes. Then 100 years$\times$C(2064) is a better measure of computationally intractible for this application. In other words, for critical applications that are beyond an economic value, one should strive for a good estimate of the world's computing power.

One-way functions that exhibit completeness and a good avalanche effect or the strict avalanche criterion [13] are preferable embodiments: these properties are favorable for one-way hash functions. The definition of completeness and a good avalanche effect are quoted directly from [13]:

If a cryptographic transformation is complete, then each ciphertext bit must depend on all of the plaintext bits. Thus, if it were possible to find the simplest Boolean expression for each ciphertext bit in terms of plaintext bits, each of those expressions would have to contain all of the plaintext bits if the function was complete. Alternatively, if there is at least one pair of n-bit plaintext vectors X and $X_i$ that differ only in bit i, and $f(X)$ and $f(X_i)$ differ at least in bit j for all $\{(i,j):1 \le i, j \le n\}$, the function $f$ must be complete.

For a given transformation to exhibit the avalanche effect, an average of one half of the output bits should change whenever a single input bit is complemented. In order to determine whether a m×n (m input bits and n output bits) function $f$ satisfies this requirement, the $2^m$ plaintext vectors must be divided into $2^{m-1}$ pairs, X and $X_j$ such that X and $X_j$ differ only in bit i. Then the $2^{m-1}$ exclusive-or sums $V_i = f(X) \oplus f(X_i)$ must be calculated. These exclusive-or sums will be referred to as avalanche vectors, each of which contains n bits, or avalanche variables. If this procedure is repeated for all i such that $1 \le i \le m$ and one half of the avalanche variables are equal to 1 for each i, then the function $f$ has a good avalanche effect. Of course this method can be pursued only if m is fairly small; otherwise, the number of plaintext vectors becomes too large. If that is the case then the best that can be done is to take a random sample of plaintext vectors X, and for each value i calculate all avalanche vectors $V_i$. If approximately one half the resulting avalanche variables are equal to 1 for values of i, then we can conclude that the function has a good avalanche effect.

A hash function, also denoted as Φ, is a function that accepts as its input argument an arbitrarily long string of bits (or bytes) and produces a fixed-size output of information. The information in the output is typically called a message digest or digital fingerprint. In other words, a hash function maps a variable length m of input information to a fixed-sized output, Φ(m), which is the message digest or information digest. Typical output sizes range from 160 to 512 bits, but can also be larger. An ideal hash function is a function Φ, whose output is uniformly distributed in the following way: Suppose the output size of Φ is n bits. If the message m is chosen randomly, then for each of the $2^n$ possible outputs z, the probability that Φ(m)=z is $2^{-n}$. In an embodiment, the hash functions that are used are one-way.

A good one-way hash function is also collision resistant. A collision occurs when two distinct information elements are mapped by the one-way hash function Φ to the same digest. Collision resistant means it is computationally intractable for an adversary to find collisions: more precisely, it is computationally intractable to find two distinct information elements $m_1$, $m_2$ where $m_1 \ne m_2$ and such that $\Phi(m_1) = \Phi(m_2)$.

A number of one-way hash functions may be used to implement one-way hash function 148. In an embodiment, SHA-512 can implement one-way hash function 148, designed by the NSA and standardized by NIST [14]. The message digest size of SHA-512 is 512 bits. Other alternative hash functions are of the type that conform with the standard SHA-384, which produces a message digest size of 384 bits. SHA-1 has a message digest size of 160 bits. An embodiment of a one-way hash function 148 is Keccak [15]. An embodiment of a one-way hash function 148 is BLAKE [16]. An embodiment of a one-way hash function 148 is Grøstl [17]. An embodiment of a one-way hash function 148 is JH [18]. Another embodiment of a one-way hash function is Skein [19].

7.6 Key Exchange

A Diffie-Hellman exchange [25] is a key exchange method where two parties (Alice and Bob)—that have no prior knowledge of each other—jointly establish a shared secret over an unsecure communications channel. Sometimes the first party is called Alice and the second party is called Bob. Before the Diffie-Hellman key exchange is described it is helpful to review the mathematical definition of a group. A group G is a set with a binary operation * such that the following four properties hold: (i.) The binary operation * is closed on G. This means a*b lies in G for all elements a and b in G. (ii.) The binary operation * is associative on G. That is, a*(b*c)=(a*b)*c for all elements a, b, and c in G (iii.) There is a unique identity element e in G, where a*e=e*a=a. (iv.) Each element a in G has a unique inverse denoted as $a^{-1}$. This means $a*a^{-1}=a^{-1}*a=e$.

g*g is denoted as $g^2$; g*g*g*g*g is denoted as $g^5$. Sometimes, the binary operation * will be omitted so that a*b is expressed as ab.

The integers $\{\ldots, 2, 1, 0, 1, 2, \ldots\}$ with respect to the binary operation + are an example of an infinite group. 0 is the identity element. For example, the inverse of 5 is 5 and the inverse of 107 is 107.

The set of permutations on n elements $\{1, 2, \ldots, n\}$, denoted as $S_n$, is an example of a finite group with n! elements where the binary operation is function composition. Each element of $S_n$ is a function p: $\{1, 2, \ldots, n\} \to \{1, 2, \ldots, n\}$ that is 1 to 1 and onto. In this context, p is called a permutation. The identity permutation e is the identity element in $S_n$, where e(k)=k for each k in $\{1, 2, \ldots, n\}$.

If H is a non-empty subset of a group G and H is a group with respect to the binary group operation of G, then H is called a subgroup of G. H is a proper subgroup of G if H is not equal to G (i.e., H is a proper subset of G). G is a cyclic group if G has no proper subgroups.

Define $A_n = \mathbb{Z}_n - [0] = \{[1], \ldots, [n-1]\}$; in other words, $A_n$ is the integers modulo n with equivalence class [0] removed. If n=5, [4]*[4]=[16 mod 5]=[1] in ($\mathbb{Z}_5$, *) Similarly, [3]*[4]=[12 mod 5]=[2] in ($\mathbb{Z}_5$, *). Let (a, n) represent the greatest common divisor of a and n. Let $U_n = \{[a] \in A_n : (a, n) = 1\}$. Define binary operator on $U_n$ as [a]*[b]=[ab], where ab is the multiplication of positive integers a and b. Then ($U_n$, *) is a finite, commutative group.

Suppose g lies in group (G, *). This multiplicative notation works as follows: $g^2=g*g$. Also $g^3=g*g*g$; and so on. This multiplicative notation (superscripts) is used in the description of the Diffie-Hillman key exchange protocol described below.

For elliptic curves [26] the Weierstrauss curve group operation geometrically takes two points, draws a line through these two points, finds a new intersection point and then reflects this new intersection point about the y axis. When the two points are the same point, the commutative group operation computes a tangent line and then finds a new intersection point.

In another embodiment, elliptic curve computations are performed on an Edwards curve over a finite field.

When the field K does not have characteristic two, an Edwards curve is of the form: $x^2+y^2=1+dx^2y^2$, where d is an element of the field K not equal to 0 and not equal to 1. For an Edwards curve of this form, the group binary operator * is defined $$(x_1, y_1) * (x_2, y_2) = \left( \frac{x_1 y_2 + x_2 y_1}{1 + d x_1 x_2 y_1 y_2}, \frac{y_1 y_2 - x_1 x_2}{1 - d x_1 x_2 y_1 y_2} \right),$$

where the elements of the group are the points $(x_1, y_1)$ and $(x_2, y_2)$. The definition of * defines elliptic curve computations that form a commutative group. For more information on Edwards curves, refer to the math journal paper [27].

In an alternative embodiment, elliptic curve computations are performed on a Montgomery curve over a finite field. Let K be the finite field over which the elliptic curve is defined. A Montgomery curve is of the form $By^2=x^3+Ax^2+x$, for some field elements A, B chosen from K where $B(A^2-4)\neq 0$. For more information on Montogomery curves, refer to the publication [28].

There are an infinite number of finite groups and an infinite number of these groups are huge. The notion of huge means the following: if $2^{1024}$ is considered to be a huge number based on the computing power of current computers, then there are still an infinite number of finite, commutative groups with each group containing more than $2^{1024}$ elements.

Before the Diffie-Hellman key exchange is started, in some embodiments, Alice and Bob agree on a huge, finite commutative group (G, *) with group operation * and generating element g in G, where g has a huge order. In some embodiments, Alice and Bob sometimes agree on group (G, *) and element g before before the key exchange starts; g is assumed to be known by Eve. The group operations of G are expressed multiplicatively as explained previously.

In a standard Diffie-Hellman key exchange, Alice executes steps 1 and 3 and Bob executes steps 2 and 4.

1. Alice randomly generates private key a, where a is a large natural number, and sends $g^a$ to Bob.
2. Bob randomly generates private key b, where b is a large natural number, and sends $g^b$ to Alice.
3. Alice computes $(g^b)^a$.
4. Bob computes $(g^a)^b$.

After the key exchange is completed, Alice and Bob are now in possession of the same shared secret $g^{ab}$. The values of $(g^b)^a$ and $(g^a)^b$ are the same because G is a commutative group. Commutative means ab=ba for any elements a, b in G.

7.7 Scatter Map Hiding

A scatter map is a function that permutes the constituents of a public key to a sequence of distinct locations inside the random noise. To formally define a scatter map, the location space is defined first. In some embodiments, each constituent of a public key is a bit (i.e., a 0 or 1).

Definition 1.

Let $m,n \in \mathbb{N}$, where $m \leq n$. The set $\mathcal{L}_{m,n}=\{(l_1, l_2 \ldots l_m) \in \{1, 2, \ldots n\}^m : l_j \neq l_k \text{ whenever } j \neq k\}$ is called an (m, n) location space.

Remark 1.

The location space $\mathcal{L}_{m,n}$ has $$\frac{n!}{(n-m)!}$$

elements.

Definition 2.

Given a location element $(l_1, l_2 \ldots l_m) \in \mathcal{L}_{m,n}$, the noise locations with respect to $(l_1, l_2 \ldots l_m)$ are denoted as $\mathcal{N}(l_1, l_2 \ldots l_m) = \{1, 2, \ldots, n\} - \{l_i : 1 \leq i \leq m\}$.

Definition 3.

An (m, n) scatter map is an element $\pi=(l_1, l_2 \ldots l_m) \in L_{m,n}$ such that $\pi: \{0,1\}^m \times \{0,1\}^{n-m} \to \{0,1\}^n$ and $\pi(d_1, \ldots, d_m, r_1, r_2 \ldots r_{n-m})=(s_1, \ldots s_n)$ where the hiding locations $s_{l_i}$ are selected as follows. Set $s_{l_1}=d_1$ $s_{l_2}=d_2 \ldots s_{l_m}=d_m$. For the noise locations, set $s_{i_1}=r_1$ for the smallest subscript $i_1 \in \mathcal{N}(\pi)$. Set $s_{i_k}=r_k$ for the kth smallest subscript $i_k \in \mathcal{N}(\pi)$.

Definition 3 describes how the scatter map selects the hiding locations of the parts of the key hidden in the noise. Furthermore, the scatter map process stores the noise in the remaining locations that do not contain parts of the one or more public keys. Before the scatter map process begins, it is assumed that an element $\pi \in \mathcal{L}_{m,n}$ is randomly selected with a uniform distribution and Alice and Bob already have secret scatter map $\pi=(l_1, l_2 \ldots l_m)$.

Hiding Process 1. Alice Hides One or Public More Keys in Noise

Alice generates one or more private keys $p_1 p_2 \ldots p_m$ using her random generator.

Using her private key(s) $p_1 p_2 \ldots p_m$, Alice computes one or more public keys $k_1 k_2 \ldots k_m$. Per definition 3, Alice stores her public key(s) $s_{l_1}=k_1 \ldots s_{l_m}=k_m$ using scatter map $\pi$.

With her random generator, Alice generates noise $r_1 r_2 \ldots r_\rho$. Per definition 3, Alice stores the noise $r_1 r_2 \ldots r_\rho$ in the noise (unoccupied) locations of $\mathcal{S}=(s_1 \ldots s_n)$ so that her one or more public keys $k_1 k_2 \ldots k_m$ are hidden in the noise.

Alice transmits $\mathcal{S}$ to Bob.

Bob receives $\mathcal{S}$.

Bob uses scatter map $\pi$ to extract Alice's one or more public keys $k_1 \ldots k_m$ from $\mathcal{S}$.

In an embodiment of process 1, scatter map $\pi$ is executed by scatter map instructions 130 (FIG. 1B) and these instructions follow definition 3. In FIG. 2B, processor system 258 executes scatter map process instructions 130 during the step Alice stores one or more keys $s_{l_1}=k_1 \ldots s_{l_m}=k_m$ using scatter map $\pi$. In an embodiment, scatter map process instructions 130 are stored in memory system 256 (FIG. 2B). In FIG. 2B, processor system 258 executes scatter map process instructions 130 during the step Alice stores the noise $r_1 r_2 \ldots r_\rho$ in the noise (unoccupied) locations of $S=(s_1 \ldots s_n)$ so that the one or more keys $k_1 k_2 \ldots k_m$ are hidden in the noise.

In an embodiment of process 1, output system 252 in FIG. 2B is used during the step Alice sends $\mathcal{S}$ to Bob. Output system 252 is part of sending machine 102 in FIG. 1A. In an embodiment of process 1, input system 254 in FIG. 2B is used during the step Bob receives $\mathcal{S}$. Input system 254 is a part of receiving machine 112 in FIG. 1A.

In FIG. 2B, processor system 258 executes scatter map process instructions 130 during the step Bob uses scatter map $\pi$ to extract Alice's one or more public keys $k_1 \ldots k_m$ from $\mathcal{S}$.

In an embodiment of process 1, output system 252 is used during the step Alice sends $\mathcal{S}$ to Bob. Output system 252 is part of sending machine 102 in FIG. 1A. In an embodiment of process 1, input system 254 is used during the step Bob receives $\mathcal{S}$. Input system 254 is a part of receiving machine 112 in FIG. 1A.

When the scatter size is n, process 1 takes n steps to hide the public keys inside the noise. When the scatter size is n, process 1 takes n steps to hide one or more keys inside the noise. FIG. 11 shows an embodiment of process 1, where Alice hides a 512-bit public key in 1024 bits of noise. FIG. 12 shows an embodiment of process 1, where Bob extracts the 512-bit public key hidden in 1024 bits of noise.

In some embodiments, a scatter size of 10,000 bits is feasible with a key size of 2000 bits and noise size of 8000 bits. In some embodiments, a scatter size of 20,000 bits is feasible with a key size of 5000 bits and noise size of 15000 bits. In some applications, Alice and Bob may also establish the key size m as a shared secret, where m is not disclosed to Eve.

7.8 Effective Hiding

This section provides the intuition for effective hiding. Effective hiding occurs when Eve obtains no additional information about scatter map σ after Eve observes multiple hidden key or hidden data transmissions. Section 7.9 provides mathematical analysis of this intuition.

The effectiveness of the hiding depends upon the following observation. Even after Eve executes a search algorithm for the data (signal) in the noise, Eve's search algorithm does NOT know when it has found the key or the data because her search algorithm CANNOT distinguish the signal from the noise. This is illustrated by FIGS. 5 and 6.

Figure 5:
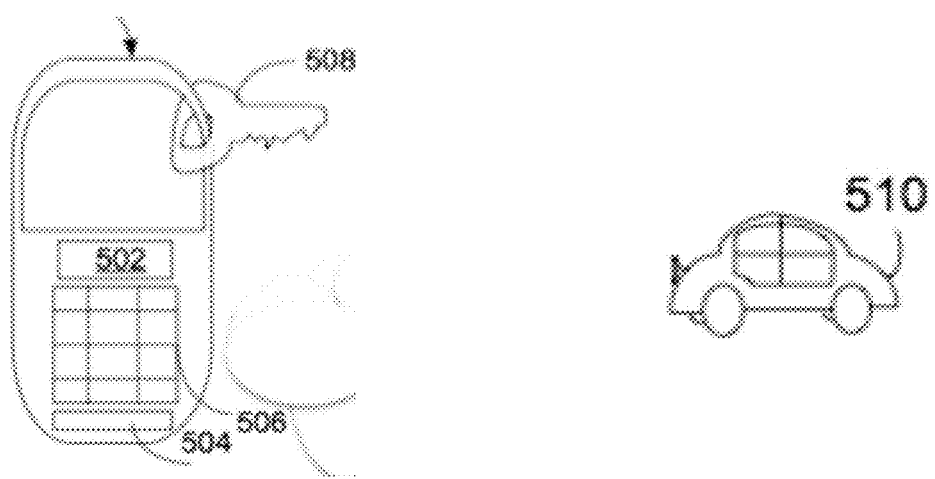
FIG. 5 shows a mobile phone embodiment 500 that hides public keys and transmits them wirelessly to an automobile, which may include the sending and/or receiving machines of FIG. 1A.

The pixel values in FIGS. 5 and 6 that compose the secret are hidden in the noise of the visual image such that the probabilities of the pixel values satisfy the two randomness axioms. Suppose Eve performs a brute force search over all $$\frac{n!}{(n-m)!}$$

possibilities for scatter map σ. Even if Eve's search method stumbles upon the correct sequence of locations, Eve's method has no basis for distinguishing the data from the noise because the key and noise probability distributions are equal. For FIG. 5, Eve does not have a terminating condition for halting with this sequence of bit locations hiding the key. For FIG. 6, Eve does not have a terminating condition for halting with this sequence of locations hiding the data.

In FIGS. 7 and 8, Eve can obtain some locations of the hidden data or hidden key because the probability distribution of the secret (foreground) is not the same as the noise (background): Eve can determine the secret is located in a P shape, because the probability distribution of these secret pixels violates the randomness axioms.

7.9 Multiple Scattered Data Transmissions

This section analyzes the mathematics of when a scatter map is safest to reuse for multiple, scattered transmissions. Suppose that scatter map $\pi \in \mathcal{L}_{m,n}$ is established with Alice and Bob, according to a uniform probability distribution and adversary Eve has no information about π. Before Eve sees the first scatter transmission from Alice to Bob, from Eve's perspective, the probability $$P(\pi = (l_1, l_2 \ldots l_m)) = \frac{(n-m)!}{n!}$$

for each $(l_1, l_2 \ldots l_m)$ in $\mathcal{L}_{m,n}$: in other words, Eve has zero information about π with respect to $\mathcal{L}_{m,n}$.

Next, two rules are stated whose purpose is to design embodiments that do not lead leak information to Eve. Section 7.11 shows some embodiments that authenticate the public key(s) hidden in the noise. Embodiments that follow these rules help hinder Eve from actively sabotaging Alice and Bob to violate these rules.

Rule 1. New Noise and New Key(s)

For each scattered transmission, described in process 1, Alice computes one or more new public keys $k_1 \ldots k_m$ and Alice also creates new noise $r_1 \ldots r_{n-m}$ from a random number generator that satisfies the no bias and history has no effect properties.

Rule 2. No Auxiliary Information

During the kth scattered transmission, Eve only sees scattered transmission $\mathcal{S}(k)$; Eve receives no auxiliary information from Alice or Bob. Scattered transmission $\mathcal{S}(k)$ represents the key(s) hidden in the noise.

Theorem 1.

When Eve initially has zero information about π w.r.t. $\mathcal{L}_{m,n}$, and rules 1 and 2 hold, then Eve still has zero information about π after she observes scattered transmissions $\mathcal{S}(1), \mathcal{S}(2), \ldots \mathcal{S}(k)$.

In a proof of theorem 1, the following terminology is used. i lies in $\pi = (l_1, l_2 \ldots l_m)$ if $i = l_j$ for some $1 \le j \le m$. Similarly, i lies outside π if $i \ne l_j$ for every $1 \le j \le m$. In this latter case, i is a noise location.

PROOF. Consider the ith bit location in the scattered transmission. Let $x_i(k)$ denote the ith bit observed by Eve during the kth scattered transmission $\mathcal{S}(k)$. The scatter map π is established before the first transmission based on a uniform probability distribution; rule 1 implies the public key and noise generation obey the two properties of no bias and history has no effect, These rules imply the conditional probabilities $P(x_i(k+1)=1|x_i(k)=b)=\frac{1}{2}=P(x_i(k+1)=0|x_i(k)=b)$ hold for $b \in \{0, 1\}$, independent of whether i lies in π or i lies outside π. Rule 2 implies that if Eve's observation of $\mathcal{S}(1), \mathcal{S}(2), \ldots \mathcal{S}(k)$ enabled her to obtain some information, better than $$P(\pi = (l_1, l_2 \ldots l_m)) = \frac{(n-m)!}{n!},$$

about whether i lies in π or i lies outside π, then this would imply that the probability distribution of the noise is distinct from the probability distribution of the public key(s), which is a contradiction. □

Remark 2.

Theorem 1 is not true if the probability distribution of the noise is distinct from the probability distribution of the public key(s).

In embodiments, remark 2 advises us not to let Alice violate rule 1: an example of what Alice should not do is send the same public key(s) in multiple executions of processes 1 2 and 3 when the noise is randomly generated for each execution.

7.10 Single Transmission Analysis

The size of the location space is significantly greater than the key size. Even for values of n as small as 30, $$\frac{n!}{(n-m)!} \gg 2^m.$$

The uniform distribution of the noise and the data generation and a large enough noise size poses Eve with the challenge that even after seeing the transmission $\mathcal{S} = (s_1 \ldots s_n)$, she has almost no more information about the data or key(s), than before the creation of $k_1 k_2 \ldots k_m$. The forthcoming analysis will make this notion of almost no more information more precise.

In some applications, Alice and Bob may also establish the one or more public keys size m as a shared secret, where m is not disclosed to Eve. In the interests of being conservative about the security, it is assumed that Eve knows the data size m. For applications where Eve doesn't know m, the information security will be stronger than the results obtained in this section.

Process 1 is analyzed with counting and asymptotic results that arise from the binomial distribution. First, some preliminary definitions are established.

For $0 \leq i \leq n$, define $E_{i,n} = \{r \in \{0,1\}^n : \eta_1(r) = i\}$. When $n=4$, $E_{0,4} = \{0000\}$, $E_{1,4} = \{0001, 0010, 0100, 1000\}$, $E_{2,4} = \{0011, 0101, 0110, 1001, 1010, 1100\}$, $E_{3,4} = \{0111, 1011, 1101, 1110\}$ and $E_{4,4} = \{1111\}$. Note $$|E_{k,n}| = \frac{n!}{(n-k)!k!} = \binom{n}{k}.$$

The expression—the ith element of $E_{k,n}$—refers to ordering the set $E_{k,n}$ according to an increasing sequence of natural numbers that each binary string represents and selecting the ith element of this ordering. For example, the 3rd element of $E_{2,4}$ is 0110.

In table 1, event $B_{l,j}$ refers to the ith data in $E_{j,m}$. Event $R_i$ refers to the set of random noise elements which have i ones, and the noise size is $\rho = n-m$. Event $A_i$ refers to a scatter $(s_1 \ldots s_n)$ which contains i ones.

Equation 7.1 follows from the independence of events $R_k$ and $B_{l,j}$.

$$P(R_k \cap B_{l,j}) = P(R_k) \cap P(B_{l,j}) \quad (7.1)$$

whenever $0 \leq k \leq \rho$ and $0 \leq j \leq m$ and $1 \leq l \leq \binom{m}{j}$.

Equation 7.2 follows from the definitions in table 1; $\eta_1(s_1 \ldots s_n) = \eta_1(r_1 \ldots r_\rho) + \eta_1(k_1 \ldots k_m)$; and the meaning of conditional probability.

$$P(A_k | B_{l,j}) = P(R_{k-j}) = \binom{\rho}{k-j} 2^{-\rho} \quad (7.2)$$

whenever $0 \leq j \leq \min\{k,m\}$ and $$1 \leq l \leq \binom{m}{j}.$$

A finite sample space and $$P\left(\bigcup_{j=0}^{m} \bigcup_{l=1}^{|E_{j,m}|} B_{l,j}\right) = 1$$

imply that each event $$A_k \subset \bigcup_{j=0}^{m} \bigcup_{l=1}^{|E_{j,m}|} B_{l,j}.$$

Furthermore, $B_{l_1,j_1} \cap B_{l_2,j_2} = \emptyset$ whenever $l_1 \neq l_2$ or $j_1 \neq j_2$ such that $0 \leq j_1, j_2 \leq m$ and $1 \leq l_1 \leq E_{j_1,m}$ and $1 \leq l_2 \leq E_{j_2,m}$. Thus, Bayes Law is applicable. Equation 7.3 follows from Bayes Law and the derivation below 7.3.

$$P(B_j | A_k) = \frac{\binom{\rho}{k-j}}{\sum_{b=0}^{\min\{k,m\}} \binom{m}{b}\binom{\rho}{k-b}} \quad (7.3)$$

whenever $0 \leq j \leq \min\{k,m\}$ and $$1 \leq l \leq \binom{m}{j}.$$

The mathematical steps that establish equation 7.3 are shown below.

$$P(B_{l,j} | A_k) = \frac{P(B_{l,j}) P(A_k | B_{l,j})}{\sum_{b=0}^{\min\{k,m\}} \sum_{a=1}^{|E_{b,m}|} P(B_{a,b}) P(A_k | B_{a,b})}$$

$$= \frac{P(A_k | B_{l,j})}{\sum_{b=0}^{\min\{k,m\}} \sum_{a=1}^{|E_{b,m}|} P(A_k | B_{a,b})}$$

$$= \frac{\binom{\rho}{k-j} 2^{-\rho}}{\sum_{b=0}^{\min\{k,m\}} |E_{b,m}| \binom{\rho}{k-j} 2^{-\rho}}.$$

Definition 4.

Let c be a positive integer. $f: \mathbb{N} \to \mathbb{N}$ is called a binomial c-standard deviations function if there exists $N \in \mathbb{N}$ such that whenever $\rho \geq N$, $$\left| f(\rho) - \frac{\rho}{2} \right| \leq c \frac{\sqrt{\rho}}{2}$$

Define the function $$h_c(\rho) = \max\left\{0, \frac{\rho}{2} - \left\lfloor c \frac{\sqrt{\rho}}{2} \right\rfloor\right\}.$$

Then $h_c$ is a binomial c-standard deviations function. Lemmas 2 and 3 may be part of the binomial distribution folklore; for the sake of completeness, they are proven below.

Let $k: \mathbb{N} \to \mathbb{N}$ be a binomial c-standard deviations function. Then $$\lim_{\rho \to \infty} \frac{\binom{\rho}{k(\rho)-1}}{\binom{\rho}{k(\rho)}} = 1.$$

PROOF. A simple calculation shows that $$\frac{\binom{\rho}{k(\rho)-1}}{\binom{\rho}{k(\rho)}} = \frac{k(\rho)}{\rho - k(\rho) + 1}.$$

Since $k(\rho)$ is a binomial c-standard deviations function, $$\frac{\rho}{2} - \frac{c\sqrt{\rho}}{2} \leq k(\rho) \leq \frac{\rho}{2} + \frac{c\sqrt{\rho}}{2}.$$

This implies $$\frac{\rho}{2} + \frac{c\sqrt{\rho}}{2} + 1 \geq \rho - k(\rho) + 1 \geq \frac{\rho}{2} - \frac{c\sqrt{\rho}}{2}.$$

Thus, $$\frac{\frac{\rho}{2} - \frac{c\sqrt{2}}{2}}{\frac{\rho}{2} + \frac{c\sqrt{\rho}}{2} + 1} \leq \frac{\binom{\rho}{k(\rho)-1}}{\binom{\rho}{k(\rho)}} \leq \frac{\frac{\rho}{2} + \frac{c\sqrt{\rho}}{2}}{\frac{\rho}{2} - \frac{c\sqrt{\rho}}{2}}. \quad (7.4)$$

Since $$\lim_{\rho \to \infty} \frac{\frac{\rho}{2} - \frac{c\sqrt{\rho}}{2}}{\frac{\rho}{2} + \frac{c\sqrt{\rho}}{2} + 1} = 1 = \lim_{\rho \to \infty} \frac{\frac{\rho}{2} + \frac{c\sqrt{\rho}}{2}}{\frac{\rho}{2} - \frac{c\sqrt{\rho}}{2}},$$

apply the squeeze theorem to equation 7.4. □

The work from lemma 2 helps prove lemma 3. Lemma 3 helps prove that equation 7.3 converges to $2^{-m}$ when $k(\rho)$ is a binomial c-standard deviations function.

Lemma 3.

Fix $m \in \mathbb{N}$. Let $k: \mathbb{N} \to \mathbb{N}$ be a binomial c-standard deviations function. For any b, j such that $0 \leq b, j \leq m$, then $$\lim_{\rho \to \infty} \frac{\binom{\rho}{k(\rho)-j}}{\binom{\rho}{k(\rho)-b}} = 1.$$

PROOF. Using a similar computation to equation 7.4 inside of c+1 standard deviations instead of c, then $\rho$ can be made large enough so that $k(\rho)-b$ and $k(\rho)-j$ lie within c+1 standard deviations so that $$\lim_{\rho \to \infty} \frac{\binom{\rho}{k(\rho)-i-1}}{\binom{\rho}{k(\rho)-i}} = 1$$

where $0 \leq i \leq m$. W.L.O.G., suppose j<b. Thus, $$\lim_{\rho \to \infty} \frac{\binom{\rho}{k(\rho)-j}}{\binom{\rho}{k(\rho)-b}} =$$

$$\lim_{\rho \to \infty} \frac{\binom{\rho}{k(\rho)-j}}{\binom{\rho}{k(\rho)-(j+1)}} \lim_{\rho \to \infty} \frac{\binom{\rho}{k(\rho)-(j+1)}}{\binom{\rho}{k(\rho)-(j+2)}} \cdots \lim_{\rho \to \infty} \frac{\binom{\rho}{k(\rho)-(b-1)}}{\binom{\rho}{k(\rho)-n}} = 1$$

□

Theorem 4.

Fix data size $m \in \mathbb{N}$. Let $c \in \mathbb{N}$. Let $k: \mathbb{N} \to \mathbb{N}$ be a binomial c-standard deviations function. Then $$\lim_{\rho \to \infty} P(B_{l,j} | A_{(k)\rho}) = 2^{-m}.$$

PROOF.

$$\lim_{\rho \to \infty} P(B_{l,j} | A_{(k)\rho}) = \lim_{\rho \to \infty} \left[ \sum_{b=0}^{\min\{k(\rho),m\}} \binom{m}{b} \frac{\binom{\rho}{k(\rho)-b}}{\binom{\rho}{k(\rho)-j}} \right]^{-1} \quad \text{from equation 7.3}$$

$$= \left[ \sum_{b=0}^{m} \binom{m}{b} \lim_{\rho \to \infty} \frac{\binom{\rho}{k(\rho)-b}}{\binom{\rho}{k(\rho)-j}} \right]^{-1}$$

since $m$ is fixed
and $\rho \to \infty$ implies
$k(\rho) > m$.

$= 2^{-m}.$ □   from lemma 2

Remark 3.

Theorem 4 is not true when $k(\rho)$ stays on or near the boundary of Pascal's triangle. Consider $$\lim_{\rho \to \infty} \frac{\binom{\rho}{0}}{\binom{\rho}{1}} = 0$$

or $$\lim_{\rho \to \infty} \frac{\binom{\rho}{1}}{\binom{\rho}{2}} = 0.$$

The math confirms common sense: namely, if Eve sees event $A_0$, then Eve knows that Alice's data is all zeroes. A practical and large enough noise size enables process 1 to effectively hide the data transmission so that outlier events such as $A_0$, $A_1$ do not occur in practice. For example, when n=2048, $P(A_0)=2^{-2048}$ and $P(A_1)=2^{-2037}$.

Definitions 5, 6 and theorems 5, 6 provide a basis for calculating how big the noise size should be in order to establish an extremely low probability that Eve will see outlier events such as $A_0$.

Definition 5.

$f: \mathbb{N} \to \mathbb{N}$ is an binomial $\epsilon$-tail function if there exists $N \in \mathbb{N}$ such that $n \geq N$ implies that $$2^{-n}\left(\sum_{k=0}^{f(n)} \binom{n}{k} + \sum_{k=n-f(n)}^{n} \binom{n}{k}\right) < \epsilon.$$

The area under the standard normal curve from $-\infty$ to x is expressed as $$\Phi(x) = \frac{1}{\sqrt{2\pi}} \int_{-\infty}^{x} e^{-\frac{1}{2}t^2} dt.$$

Theorem 5.

For each $c \in \mathbb{N}$, set $\epsilon_c = 4\,\Phi(-c)$. The function $$g_c(n) = \max\left\{0, \left\lfloor \frac{n}{2} - c\frac{\sqrt{n}}{2} \right\rfloor\right\}$$

is a binomial $\epsilon_c$-tail function.

PROOF. This is an immediate consequence of the central limit theorem [21, 22], applied to the binomial distribution. Some details are provided.

Define $$B_n(x) = 2^{-n} \sum_{k=0}^{\lfloor x \rfloor} \binom{n}{k}.$$

In [23], DeMoivre proved for each fixed x that $$\lim_{n \to \infty} B_n\left(\frac{n}{2} + x\frac{\sqrt{n}}{2}\right) = \Phi(x).$$

Thus, $$\lim_{n \to \infty} 2^{-n} \sum_{k=0}^{g_c(n)} \binom{n}{k} = \frac{1}{\sqrt{2\pi}} \int_{-\infty}^{-c} e^{\frac{1}{2}t^2} dt.$$

Now $\epsilon_c$ is four times the value of $$\frac{1}{\sqrt{2\pi}} \int_{-\infty}^{-c} e^{-\frac{1}{2}t^2} dt,$$

which verifies that $g_c$ is a binomial $\epsilon_c$-tail function. □

Example 1

This example provides some perspective on some $\epsilon$-tails and Eve's conditional probabilities. For n=2500, the scatter mean $\mu$ is 1250 and the standard deviation $$\sigma = \frac{\sqrt{2500}}{2} = 25.$$

Set c=20, so $\mu - c\sigma = 750$. A calculation shows that $$2^{-2500} \sum_{j=0}^{750} \binom{2500}{j} < 10^{-91}.$$

For n=4096, the scatter mean is 2048 and the standard deviation $\sigma = 32$. Set c=50 standard deviations, so $\mu - c\sigma = 448$. A calculation shows that $$2^{-4096} \sum_{j=0}^{448} \binom{4096}{j} < 10^{-621}.$$

Some of Eve's conditional probabilities are calculated for n=2500 and data size m=576. The average number of 1's in a key is $\mu_{key}=288$ and the standard deviation $\sigma_{key}=12$.

A typical case is when j=300 and k=1275, which are both one standard deviation to the right of the data and scatter mean, respectively. When Eve's conditional probability equals $2^{-m}$, the secrecy ratio is exactly 1. Using equation 7.3, a computer calculation shows that the secrecy ratio is $$\frac{P(B_{l,300} \mid A_{1275})}{2^{-576}} \approx 1.576,$$

so $2^{-576} < P(B_{l,300} | A_{1275}) < 2^{-575}$.

A rare event is when j=228 and k=1225. That is, j=228 is five standard deviations to the left of $\mu_{key}$ and k=1225 is one standard deviation to the left of the scatter mean. A calculation shows that $$\frac{P(B_{l,228} \mid A_{1225})}{2^{-576}} \approx 0.526.$$

Thus, $2^{-577} < P(B_{l,228}|A_{1225}) < 2^{-576}$.

An extremely rare event occurs when j=228 and k=1125. Event $A_{1125}$ is 4 standard deviations to the left.

$$\frac{P(B_{l,228} \mid A_{1125})}{2^{-576}} \approx 3840.$$

Thus, $2^{-565} < P(B_{l,228}|A_{1125}) < 2^{-564}$. While a secrecy ratio of 3840 is quite skew, it still means that even if Eve sees a scatter transmission 4 standard deviations to the left, there is still a probability in the interval $[2^{-565}, 2^{-564}]$ of Alice's data element being the event $B_{l,228}$.

Even when Eve sees a highly skewed, scattered transmission and obtains some information about the current hidden data element, Eve's observation provides her with no information about the next data element hidden in a subsequent transmission. The secrecy ratio calculations in example 1 provide the motivation for definition 6.

Definition 6.

Let $\epsilon > 0$. Eve's conditional probabilities $P(B_{l,j}|A_{k(\rho)})$ are $\epsilon$-close to perfect secrecy if there exists a binomial $\epsilon$-tail function $f$ such that for any function $k: \mathbb{N} \to \mathbb{N}$ satisfying $f(\rho) \leq k(\rho) \leq \rho - f(\rho)$, then $$\lim_{\rho \to \infty} P(B_{l,j} | A_{k(\rho)}) = 2^{-m}.$$

Theorem 6.

For any $\epsilon > 0$, there exists $M \in \mathbb{N}$ such that $\epsilon_c < \epsilon$ for all $c \geq M$ and $c \in \mathbb{N}$. Furthermore, function $g_c$ is a binomial $\epsilon_c$-tail function that makes Eve's conditional probabilities $P(B_{l,j}|A_{k(\rho)})$ $\epsilon_c$-close to perfect secrecy, where $g_c(\rho) \leq k(\rho) \leq \rho - g_c(\rho)$.

PROOF. Since $$\lim_{x \to \infty} \Phi(-x) = 0,$$

there exists $M \in \mathbb{N}$ such that $\epsilon_c < \epsilon$ for all $c \geq M$. Recall that $$h_c(\rho) = \max\left\{0, \frac{\rho}{2} - \left\lfloor c\frac{\sqrt{\rho}}{2} \right\rfloor\right\}.$$

For all $\rho \in \mathbb{N}$, $|g_c(\rho) - h_c(\rho)| \leq 1$ and $g_c(4\rho^2) - h_c(4\rho^2) = 0$. This fact and $h_c$ is a binomial c-standard deviations function together imply that lemma 3 and hence theorem 4 also hold for function $g_c$. That is, $$\lim_{\rho \to \infty} P(B_{l,j} | A_{g_c(\rho)}) = 2^{-m}.$$

Whenever function k satisfies $g_c(\rho) \leq k(\rho) \leq \rho - g_c(\rho)$, this implies k is a binomial c+1-standard deviations function. Thus, this theorem immediately follows from theorems 4, 5 and from definition 6.□

7.11 Hiding a Public Key Exchange

The Diffie-Hellman exchange [24, 25] is vulnerable to active man-in-the-middle attacks [29, 30, 31]. To address man-in-the-middle attacks, processes 2 and 3 show how to hide public session keys during a key exchange. In some embodiments, Alice and Bob have previously established secret scatter map $\sigma = (l_1, l_2 \ldots l_m)$ and authentication key $\kappa$ with a one-time pad [32]. In another embodiment, Alice and Bob may establish $\sigma$ and $\kappa$ with a prior (distinct) Diffie-Hellman exchange that is resistant to quantum computers, executing Shor's algorithm [33] or an analogue of Shor's algorithm [34]. Alternatively, Alice and Bob may establish $\sigma$ and $\kappa$ via a different channel.

Let $h_\kappa$ denote an MAC (e.g., HMAC [35] or [36]) function which will be used to authenticate the scattered transmission. The use of $h_\kappa$ helps hinder the following attack by Eve. An active Eve could flip a bit at bit location l in the scattered transmission. If no authentication occurs on the noise and the hidden key bits, then upon Alice resending a scattered transmission due to Alice and Bob not arriving at the same session key secret, Eve gains information that l lies in $\sigma$. If the scattered transmission $\mathcal{S}$ is not authenticated, Eve's manipulation of the bits in $\mathcal{S}$ her violate rule 2.

---

Hiding Process 2. First Party Hiding and
Sending a Public Key to a Second Party

---

Alice's random noise generator generates and computes private key a.
Alice uses group operation * to compute public key $g^a = k_1 k_2 \ldots k_m$ from private key a and generator g.
Alice generates noise $r_1 r_2 \ldots r_\rho$ from her random noise generator.
Per definition 3, Alice uses $\sigma$ to find the hiding locations and set $s_{l_1} = k_1 \ldots s_{l_m} = k_m$.
Alice stores noise $r_1 r_2 \ldots r_\rho$ in the remaining noise locations, resulting in $\mathcal{S} = (s_1 \ldots s_n)$.
Alice computes $h_\kappa(\mathcal{S})$.
Alice sends $\mathcal{S}$ and $h_\kappa(\mathcal{S})$ to Bob.
Bob receives $\mathcal{S}'$ and $h_\kappa(\mathcal{S})$ from Alice.
Bob computes $h_\kappa(\mathcal{S}')$ and checks it against $h_\kappa(\mathcal{S})$.
If $h_\kappa(\mathcal{S}')$ is valid
{
    Bob uses $\sigma$ to extract $g^a = k_1 \ldots k_m$ from $\mathcal{S}$.
    Bob computes shared secret $g^{ab}$.
}
else
{
    Bob rejects $\mathcal{S}'$ and asks Alice to resend $\mathcal{S}$.
}

---

Note that Alice sends $\mathcal{S}$ and Bob receives $\mathcal{S}'$ because during the transmission from Alice to Bob $\mathcal{S}$ may be tampered with by Eve or $\mathcal{S}$ may change due to physical effects. In an embodiment of process 2, Bob's steps are performed in receiving machine 112. In an embodiment of process 2, Alice's steps are performed in sending machine 102. In an embodiment of process 2, private key(s) 103 is a and public key(s) 104 is $g^a$. In an embodiment of process 2, scatter map $\sigma$ finds the hiding locations with scatter map instructions 130.

In an embodiment, the size of the transmission $\mathcal{S}$ (hidden public keys 109) is n=8192 bits and the noise size $\rho$=6400. According to $\alpha=(l_1, l_2 \ldots l_m)$, the kth bit of P is stored in bit location $l_k$. Generator g is an element of a commutative group (G, *) with a huge order. In some embodiments, G is a cyclic group and the number of elements in G is a prime number. In an embodiment, generator g has an order $o(g) > 10^{80}$. In another embodiment, generator g has an order $o(g)$ greater than $10^{1000}$. In an embodiment, Alice randomly generates with non-deterministic generator 942 in FIG. 9a, which is an instance of random generator 128 and computes private key a with private key instructions 124. In an embodiment, Alice's public key instructions 126 compute her public key as $g^a = g^* \ldots *g$ where g is multiplied by itself a times, using the group operations in (G, *). In some embodiments, the private key is randomly selected from the positive integers $\{1, 2, 3, \ldots, o(g)-1\}$.

---

Hiding Process 3. Second Party Hiding and
Sending a Public Key to the First Party

---

Bob's random noise generator generates and computes private key b.
Bob uses group operation * to compute public key $g^b = j_1 j_2 \ldots j_m$ from Bob's private key b and generator g.
Bob generates noise $q_1 q_2 \ldots q_\rho$ from his random noise generator.
Per definition 3, Bob uses $\sigma$ to find the hiding locations and set $s_{l_1} = j_1 \ldots s_{l_m} = j_m$.

Hiding Process 3. Second Party Hiding and
Sending a Public Key to the First Party Bob stores noise $q_1 \, q_2 \ldots q_\rho$ in the remaining noise locations, resulting in $\mathcal{T} = (t_1 \ldots t_n)$.
Bob computes $h_\kappa(\mathcal{T})$.
Bob sends $\mathcal{T}$ and $h_\kappa(\mathcal{T})$ to Alice.
Alice receives $\mathcal{T}'$ and $h_\kappa(\mathcal{T})$ from Bob.
Alice computes $h_\kappa(\mathcal{T}')$ and checks it against $h_\kappa(\mathcal{T})$.
If $h_\kappa(\mathcal{T}')$ is valid
{
    Alice uses σ to extract $g^b = j_1 \ldots j_m$ from $\mathcal{T}$.
    Alice computes shared secret $g^{ba}$.
}
else
{
    Alice rejects $\mathcal{T}'$ and asks Bob to resend $\mathcal{T}$.
}

Note that Bob sends $\mathcal{T}$ and Alice receives $\mathcal{T}$ because during the transmission from Bob to Alice $\mathcal{T}$ may be tampered with by Eve or $\mathcal{T}$ may change due to physical effects. In an embodiment of process 3, Alice's steps are performed in receiving machine 112. In an embodiment of process 3, Bob's steps are performed in sending machine 102. In an embodiment of process 3, private key(s) 103 is b and public key(s) 104 is $g^b$. In an embodiment of process 3, scatter map σ finds the hiding locations with scatter map instructions 130.

In an embodiment, Bob randomly generates with non-deterministic generator 952 in FIG. 9b, which is an instance of random generator 128 and computes private key b with private key instructions 124. In an embodiment, Bob's public key instructions 126 compute his public key as $g^b = g^* \ldots *g$ where g is multiplied by itself b times, using the group operations in (G, *). In some embodiments, the private key b is randomly selected from the positive integers $\{1, 2, 3, \ldots, o(g)-1\}$. In some embodiments of 2 and 3, the public keys are computed with elliptic curve computations over a finite field; in other words, G is an elliptic curve group. In other embodiments, the public keys are RSA public keys. In some embodiments, the public keys are public session keys, which means the public session keys change after every transmission $\mathcal{S}$ in process 2 and after every transmission $\mathcal{T}$ in process 3.

In some embodiments, hiding a public key during an exchange between Alice and Bob has an advantage over hiding a symmetric key: processes 2 and 3 can be used by Alice and Bob, before a subsequent encrypted communication, to communicate a short authentication secret (SAS) [37] via a different channel.

Let a, b be Alice and Bob's private keys, respectively. Let $e_1$, $e_2$ be Eve's private keys. For a key exchange, if Eve is in the middle, Eve computes $g^{e_1 a}$ with Alice; Eve computes $g^{e_2 b}$ with Bob. When Alice and Bob verify their SAS with high probability $g^{e_1 a} \neq g^{e_1 b}$ when |G| is huge. Thus, $h_\kappa(g^{e_1 a}) \neq h_\kappa(g^{e_1 b})$ with high probability, regardless of whether Eve's private keys satisfy $e_1 \neq e_2$. By communicating their short authentication secret to each other via a different channel, Alice and Bob can detect that Eve captured σ before processes 2 and 3 were executed. Eve cannot duplicate the SAS secret because Eve doesn't know Alice's private key a and Eve doesn't know Bob's private key b. This type out-of-channel authentication won't work for symmetric keys hidden inside noise. Furthermore, one anticipates that Eve will try to capture σ since complexity analysis can show that if Eve doesn't know σ, the complexity for Eve performing a man-in-the-middle can be substantially greater than the conjectured complexity of the public session keys when the noise size is sufficiently large.

It is important to recognize the difference between SAS and hiding the public keys in random noise: they are complementary methods. SAS helps notify Alice and Bob that a man-in-the-middle on a standard Diffie-Hellman exchange has occurred, but SAS DOES NOT stop a man-in-the-middle attack. SAS does not stop an adversary who has unforeseen computing power or unknown mathematical techniques. The standard Diffie-Hellman exchange depends upon the conjectured computational complexity of the underlying commutative group operation * on G. If Eve is recording all network traffic, hiding public session keys inside random noise can stop Eve from breaking the standard key exchange even if Eve has already discovered a huge, computational or mathematical breakthrough on the underlying group G or if Eve finds one at some point in the future. Public keys that are resistant to quantum computing algorithms such as Shor's algorithm are quite large (e.g., 1 million bytes and in some cases substantially larger than 1 million bytes). In contrast, 1024 bytes of hidden public keys inside noise can provide adequate protection against quantum algorithms; in other embodiments, 4096 bytes of hidden public keys inside noise provides strong protection against quantum algorithms. Processes 2 and 3 complementary property to SAS depends upon Eve not obtaining σ; in some embodiments, a one-time pad may be feasible to establish σ between Alice and Bob.

Although the invention(s) have been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

REFERENCES

[1] Claude Shannon. Communication Theory of Secrecy Systems. 1949.
[2] Charles H. Bennett and Gilles Brassard. Quantum cryptography: Public key distribution and coin tossing. In Proceedings of IEEE International Conference on Computers, Systems and Signal Processing. 175, 175-179. New York, 1984.
[3] Charles H. Bennett, Francois Bessette, Gilles Brassard, Louis Salvail and John Smolin. Experimental Quantum Cryptography. Journal of Cryptology. 5, No. 1, 3-28, 1992.
[4] P. D. Townsend, J. G. Rarity and P. R. Tapster. Single photon interference in a 10 km long optical fibre interferometer. Electronic Letters. 29, No. 7, 634-635, April 1993.
[5] P. D. Townsend, J. G. Rarity and P. R. Tapster. Enhanced single photon fringe visibility in a 10 km long prototype quantum cryptography channel. Electronic Letters. 29, No. 14, 1291-1293, July 1993.
[6] Wikipedia. Transmission Control Protocol/Internet Protocol. en.m.wikipedia.org/wiki/TCP_IP
[7] Alan M. Thuring. On computable numbers, with an application to the Entscheidungsproblem. Proc. London Math. Soc. Series 2 42 (Parts 3 and 4), 230-265, 1936. A correction, ibid. 43, 544-546, 1937.

[8] Simon Kochen and Ernst P. Specker. The Problem of Hidden Variables in Quantum Mechanics. Journal of Mathematics and Mechanics (now Indiana Univ. Math Journal) 17 No. 1, 59-87, 1967.

[9] John Conway and Simon Kochen. The Strong Free Will Theorem. Notices of the American Mathematical Society. 56(2), 226-232, February 2009.

[10] R. L. Rivest, A. Shamir, and L. Adleman. A method for obtaining digital signatures and public-key cryptosystems. Communications of the ACM. 21, 120-126, 1978.

[11] Stephen Cook. The P VS NP Problem. www.claymath.org/sites/default/file/pvsnp.pdf

[12] Klint Finley. Chinese Supercomputer Is Still the Worlds Most Powerful. Wired Magazine. Nov. 18, 2013.

[13] A. F. Webster and S. E. Tavares. On the Design of S-Boxes. Advances in Cryptology. CRYPTO 85 Proceedings. LNCS 218. Springer, 523-534, 1986.

[14] NIST. FIPS-180-2: Secure Hash Standard, August 2002. www.itl.nist.gov/fipspubs/.

[15] Guido Bertoni, Joan Daemen, Michael Peeters, Gilles Van Assche. Keccak Reference 3.0 2011. keccak.noekeon.org/ en.wikipedia.org/wiki/Keccak

[16] Jean-Philippe Aumasson, Samuel Neves, Zooko Wilcox-O'Hearn, Christian Winnerlein. BLAKE. 131002.net/blake/

[17] Praveen Gauravaram, Lars Knudsen, Krystian Matusiewicz, Florian Mendel, Christian Rechberger, Martin Schlffer, and Sren S. Thomsen. Grstl a SHA-3 candidate. www.groestl.info

[18] Hongjun Wu. The Hash Function JH. 2011. http://ehash.iaik.tugraz.at/wiki/JH http://www3.ntu.edu.ag/home/wuhj/research/jh/jh_round3.pdf

[19] Niels Ferguson, Stefan Lucks, Bruce Schneier, Doug Whiting, Mihir Bellare, Tadayoshi Kohno, Jon Callas, Jesse Walker. The Skein Hash Function Family. 2010. https://www.schneier.com/skein1.3.pdf http://en.wikipedia.org/wiki/Skein_(hash_function)

[20] Thomas Bayes. An essay towards solving a problem in the doctrine of chances. Philosophical Transactions of the Royal Society of London. 53, 370-418, 1764.

[21] William Feller. An Introduction to Probability Theory and Its Applications. Volume II. John Wiley. 1966.

[22] Harald Cramer. Mathematical Methods of Statistics. Princeton University Press. 1946.

[23] Abraham De Moivre. The Doctrine of Chances: or, A Method of Calculating the Probabilities of Events in play. 1st Edition London, 1718; 2nd edition 1738; 3rd edition 1756.

[24] Ralph C. Merkle. Secure Communications over Insecure Channels. Communications of the ACM. 21 (4), 294299, April 1978.

[25] Whitfield Diffie and Martin Hellman. New directions in cryptography. IEEE Transactions on Information Theory 22, 644-654, 1976.

[26] Joseph H. Silverman and John Tate. Rational Points on Elliptic Curves. Springer-Verlag, 1992.

[27] Harold Edwards. A normal form for elliptic curves. Bulletin of the American Mathematical Society. 44: 393-422, April, 2007.

[28] Peter Montgomery. Speeding the Pollard and Elliptic Curve Methods of Factorization. Mathematics of Computation 48 (177): 243-264, 1987.

[29] A. J. Menezes, P. C. van Oorshot, and S. A. Vanstone. Handbook of Applied Cryptography. CRC Press, N Y, 1997.

[30] P. C. van Oorschot and M. J. Wiener. On Diffie-Hellman Key Agreement with Short Exponents. Eurocrypt 1996, LNCS 1070, Springer, 332-343, 1996.

[31] A. C. Geary. Analysis of a Man-In-The-Middle-Attack on the Diffie-Hellman Key Exchange Protocol. NPS, 2009.

[32] Gilbert Vernam. Cipher printing telegraph systems for secret wire and radio telegraphic communications. J. Americ. Inst. Elect. Eng. 55, 109-15, 1926.

[33] Peter W. Shor. Algorithms for quantum computation: discrete log and factoring. In Proceedings of the 35th Annual IEEE Symposium on Foundations of Computer Science, pages 2-22, 1994.

[34] John Proos and Christof Zalka. Shor's discrete logarithm quantum algorithm for elliptic curves, 2003. http://citeseerx.ist.psu.edu/viewdoc/summary?doi-10.1.1.8.3898.

[35] Mihir Bellare, Ran Canetti and Hugo Krawczyk. Keying Hash Functions for Message Authentication. Advances in Cryptology—Crypto 96 Proceedings. LNCS 1109, N. Koblitz ed., Springer, 1996.

[36] Mark Wegman and J. Lawrence Carter. New Hash Functions and Their Use in Authentication and Set Equality. Journal of Computer and System Sciences. 22, 265-279, 1981.

[37] Serge Vaudenay. Secure Communications over Insecure Channels Based on Short Authenticated Strings. Advances in Cryptology—CRYPTO 2005. 309-326, 2005.

TABLE 1

Event Probabilities. Eve sees the (m, n) scatter $S = (s_1 \ldots s_n)$

| Event Name | Event Probability | Event Description |
|---|---|---|
| $B_{i,j}$ | $2^{-m}$ | $k_1 k_2 \ldots k_m$ is the ith data in $E_{j,m}$ |
| $R_i$ | $(_i^p) 2^{-p}$ | $\eta_1 (r_1 r_2 \ldots r_p) = i$ |
| $A_i$ | $(_i^n) 2^{-n}$ | $\eta_1 (s_1 \ldots s_n) = i$ |

The invention claimed is:

1. A process comprising:
a first party generating, by a machine, one or more private keys,
the machine having a processor system and a memory system, the processor system including one or more processors;
the first party computing, by the machine, one or more public keys by applying group operations to the one or more private keys;
the first party selecting, by the machine, multiple distinct locations for placing the one or more public keys based on a previously established secret map, the previously established secret map indicating where the one or more public keys is hidden within the noise, where the one or more public keys will be located within noise when hidden in the noise;
the first party generating the noise, by the machine;
the first party hiding, by the processor system, one or more of the first party's public keys inside the noise in the multiple distinct locations within the noise;
sending, by the machine of the first party, the one or more public keys while hidden in the noise, to a second party; wherein the second party is capable of computing the previously established secret map; and
the first party receiving from the second party, one or more of the public keys of the second party that were hidden by the second party.

2. The process of claim 1 each of the one or more public keys have a plurality of parts, the process further comprising:
- selecting a hiding location for each part of the plurality of parts of the one or more keys;
- storing each part of the plurality of parts of the one or more public keys in the hiding location that was selected;
- storing the noise in remaining locations that are unoccupied by parts of the one or more public keys.

3. The process of claim 2 further comprising:
- the first party sending one or more public keys, which were hidden inside the noise, to a location outside of a sending machine of the first party.

4. The process of claim 3 further comprising:
- the second party receiving the one or more public keys from the first party;
- the second party extracting the one or more public keys that were sent by the machine of the first party;
- the second party generating one or more private keys;
- the second party computing public keys of the second party by applying one or more group operations to one or more private keys of the second party;
- the second party generating noise;
- the second party hiding one or more of the public keys of the second party in the noise generated by the second party;
- the second party transmitting, to the first party, the one or more of the public keys that were hidden by the second party.

5. The process of claim 4 further comprising:
- the second party computing the map to find the hiding locations of the parts of the first party's one or more keys;
- the second party extracting the one or more public keys of the first party from the noise with the hiding locations.

6. The process of claim 5 further comprising:
- the second party applying group operations between the one or more private keys of the second party and the public keys that were extracted;
- the group operations resulting in a shared secret for the second party.

7. The process of claim 4 further comprising:
- the first party receiving the one or more public keys of the second party from second party, the one or more public keys of the second party being one or more public keys of the second party that were hidden;
- the first party extracting the one or more public keys of the second party that were hidden;
- the first party applying group operations between the one or more private keys of the first party and the public keys of the second party that were extracted;
- the group operations resulting in a shared secret for the first party.

8. The process of claim 1 further comprising:
- the first party having a distinct authentication key from the one or more public keys that were hidden;
- the first party applying a one-way hash function to a combination of the authentication key and the one or more public keys that were hidden;
- the first party also transmitting output of a one-way hash function to the second party.

9. The process of claim 1, the sending of the public keys of the first party being over a public channel.

10. The process of claim 9, the public channel being as noiseless as a standard public channel.

11. The process of claim 1, the secret mapping allocating at least twice as many bits for noise than bits for the one or more public keys.

12. The process of claim 1, where in finding the one or more public keys in the noise has a computational complexity that is greater than a computational complexity of an underlying block cipher or stream cipher.

13. A process comprising:
- generating, by a machine, one or more private keys,
- the machine having a processor system and a memory system,
- the processor system including one or more processors;
- computing, by the machine, one or more public keys from the private keys;
- the first party selecting, by the machine, multiple distinct locations for placing the one or more public keys based on a previously established secret map, the distinct locations being locations where the one or more public keys will be located within noise when hidden in the noise;
- generating the noise, by the machine;
- and hiding, by the processor system, the one or more public keys in the noise, where the one or more public keys are located within the multiple distinct locations while hidden in the noise; wherein the second party has the previously established secret map; and
- the first party receiving from the second party, one or more of the public keys of the second party that were hidden by the second party.

14. The process of claim 13 wherein a non-deterministic process generates the noise.

15. The process of claim 14,
- the non-deterministic process is based at least on a behavior of photons.

16. The process of claim 15 further comprising:
- emitting said photons from a light emitting diode.

17. The process of claim 13 further comprising: a machine-implemented method that generates the noise and wherein there twice as many bits storing noise than bits storing the one or more public keys.

18. The process of claim 13 further comprising:
- the generating one or more private keys uses a non-deterministic generator.

19. The process of claim 13 wherein the generating of the noise has a probability distribution and the generating of the one or more public keys has a probability distribution, which is the same as the probability distribution of the generating of the noise.

20. An information system comprising:
- a first party generating, by a machine, one or more private keys,
- the machine having a processor system and a memory system, the processor system including one or more processors;
- the first party computing, by the machine one or more public keys by applying group operations to the one or more private keys;
- the first party selecting, by the machine, multiple distinct locations for placing the one or more public keys, where the keys will be located within noise when hidden in the noise, based on a previously established secret map, the previously established secret map indicating where one or more the public key is hidden within the noise;
- the first party generating, by the machine, the noise;

the first party hiding, by the processor system, one or more of first the party's public keys in the multiple distinct locations inside the noise;

sending, by the machine, the one or more public keys to a second party, while the one or more public keys are hidden in the noise, wherein the second party has the previously established secret map; and the first party receiving from the second party, one or more of the public keys of the second party that were hidden by the second party.

21. The system of claim 20 each of the one or more public keys have a plurality of parts, the system further comprising:

selecting a hiding location for each part of the plurality of parts of the one or more keys;

storing each part of the plurality of parts of the one or more public keys in the hiding location that was selected;

storing the noise in remaining locations that are unoccupied by parts of the one or more public keys.

22. The system of claim 21 further comprising:

the first party sending one or more public keys, which were hidden inside the noise, to a location outside of a sending machine of the first party.

23. The system of claim 22 further comprising:

the second party receiving the one or more public keys from the first party;

the second party extracting the one or more public keys that were sent by the machine of the first party;

the second party generating one or more private keys;

the second party computing public keys of the second party by applying one or more group operations to one or more private keys of the second party;

the second party generating noise;

the second party hiding one or more of second the public keys of the second party in the noise generated by the second party;

the second party transmitting, to the first party, one or more of the public keys that were hidden by the second party.

24. The system of claim 23 further comprising:

the second party extracting one or more public keys of the first party from the noise with the hiding locations.

25. The system of claim 24 further comprising:

the second party applying group operations between the one or more private keys of the second party and the public keys that were extracted;

the group operations resulting in a shared secret, obtained by the second party.

26. The system of claim 23 further comprising:

the first party receiving the one or more public keys of the second party from second party, the one or more public keys of the second party being one or more public keys of the second party that were hidden;

the first party extracting the one or more public keys or the second party that were hidden;

the first party applying group operations between the one or more private keys of the first party and the public keys of the second party that were extracted;

the group operations resulting in a shared secret, obtained by the first party.

27. The system of claim 20 further comprising:

the first party having a distinct authentication key from the hidden one or more public keys;

the first party applying a one-way hash function to a combination of the authentication key and the one or more public keys hidden in the noise and the noise;

the first party also transmitting the output of the one-way hash function to the second party.

28. The system of claim 20, wherein the one or more public keys are allocated, by the secret map, half as many bits as are allocated to the noise.

29. The system of claim 20, wherein the one or more public keys are RSA public keys.

* * * * *